(12) United States Patent
Kim et al.

(10) Patent No.: US 10,819,940 B2
(45) Date of Patent: Oct. 27, 2020

(54) DISPLAY APPARATUS AND COMPUTING APPARATUS INCLUDING THE SAME

(71) Applicant: LG Display Co., Ltd., Seoul (KR)

(72) Inventors: DongUk Kim, Seoul (KR); JongSeo Yoon, Seoul (KR); DongIl Chung, Gwangmyeong-si (KR); ByeongJun Lee, Seoul (KR); JaeMin Shin, Daegu (KR); JinHo Park, Gumi-si (KR)

(73) Assignee: LG Display Co., Ltd., Seoul (KR)

(*) Notice: Subject to any disclaimer, the term of this patent is extended or adjusted under 35 U.S.C. 154(b) by 37 days.

(21) Appl. No.: 16/004,967

(22) Filed: Jun. 11, 2018

(65) Prior Publication Data

US 2019/0037164 A1  Jan. 31, 2019

(30) Foreign Application Priority Data

Jul. 31, 2017 (KR) .................. 10-2017-0097325

(51) Int. Cl.
| | |
|---|---|
| H04N 5/64 | (2006.01) |
| H04R 1/02 | (2006.01) |
| H04R 17/00 | (2006.01) |
| H04R 1/28 | (2006.01) |
| G02F 1/1333 | (2006.01) |

(52) U.S. Cl.
CPC ............ *H04N 5/642* (2013.01); *H04R 1/025* (2013.01); *H04R 1/026* (2013.01); *H04R 1/2873* (2013.01); *H04R 17/005* (2013.01); *G02F 2001/133317* (2013.01); *G02F 2201/505* (2013.01); *H04R 2499/15* (2013.01)

(58) Field of Classification Search
CPC ..................................................... H04N 5/642
See application file for complete search history.

(56) References Cited

U.S. PATENT DOCUMENTS

| 6,137,890 | A | 10/2000 | Markow | |
|---|---|---|---|---|
| 9,431,926 | B2 * | 8/2016 | Choi | ............... H02N 2/006 |
| 9,793,463 | B2 * | 10/2017 | Son | ............... H01L 41/0475 |
| 10,200,772 | B2 * | 2/2019 | Ahn | ............... H04R 7/045 |

(Continued)

FOREIGN PATENT DOCUMENTS

| CN | 1575028 A | 2/2005 |
|---|---|---|
| CN | 1741724 A | 3/2006 |

(Continued)

OTHER PUBLICATIONS

Korean Office Action dated Jan. 16, 2019, issued in counterpart Korean Patent Application No. 10-2018-0138045.

(Continued)

*Primary Examiner* — Irfan Habib
(74) *Attorney, Agent, or Firm* — Morgan, Lewis & Bockius LLP

(57) ABSTRACT

A display apparatus and a computing apparatus including the same are provided. A display apparatus includes: a display module including a display panel configured to display an image, a system rear cover covering a rear surface of the display module, a vibration plate between the system rear cover and the rear surface of the display module, and a vibration module configured to vibrate the vibration plate, wherein the display panel is further configured to vibrate based on a vibration of the vibration plate to output sound.

29 Claims, 12 Drawing Sheets

(56) References Cited

U.S. PATENT DOCUMENTS

| | | | |
|---|---|---|---|
| 10,448,131 B1* | 10/2019 | Tanaka | H04R 7/045 |
| 2004/0037441 A1 | 2/2004 | Konishi et al. | |
| 2004/0246109 A1 | 12/2004 | Suzuki et al. | |
| 2006/0039575 A1 | 2/2006 | Wada | |
| 2010/0157201 A1 | 6/2010 | Moon et al. | |
| 2011/0069055 A1 | 3/2011 | Jung et al. | |
| 2013/0064401 A1 | 3/2013 | Wang et al. | |
| 2014/0160040 A1* | 6/2014 | Kang | H04R 17/005 345/173 |
| 2014/0217559 A1 | 8/2014 | Choi et al. | |
| 2015/0185963 A1 | 7/2015 | Lee et al. | |
| 2016/0124460 A1 | 5/2016 | Murata et al. | |
| 2016/0170539 A1* | 6/2016 | Watanabe | B06B 1/0611 345/173 |
| 2017/0105294 A1* | 4/2017 | Shimoda | H04B 1/3888 |
| 2017/0150244 A1 | 5/2017 | Park | |
| 2017/0280234 A1 | 9/2017 | Choi et al. | |

FOREIGN PATENT DOCUMENTS

| | | | |
|---|---|---|---|
| CN | 102996376 | A | 3/2013 |
| CN | 103869523 | A | 6/2014 |
| CN | 104751743 | A | 7/2015 |
| CN | 105096778 | A | 11/2015 |
| CN | 105339875 | A | 2/2016 |
| EP | 2 570 889 | A2 | 3/2013 |
| KR | 2003-0048076 | A | 6/2003 |
| KR | 10-2005-0114163 | A | 12/2005 |
| KR | 10-2010-0071892 | A | 6/2010 |
| KR | 10-2010-0074034 | A | 7/2010 |
| KR | 10-2011-0032169 | A | 3/2011 |
| KR | 10-2014-0100302 | A | 8/2014 |
| KR | 101704517 | B1 | 2/2017 |
| KR | 10-2017-0035164 | A | 3/2017 |
| KR | 10-2017-0060285 | A | 6/2017 |
| KR | 10-1746496 | B1 | 6/2017 |

OTHER PUBLICATIONS

Office Action dated Apr. 4, 2018, issued in corresponding Korean Patent Application No. 10-2017-0097325.
European Office Action dated Apr. 3, 2020, issued in counterpart European Patent Application No. 18 177 255.9.
First Notification of Office Action dated Jun. 28, 2020, issued in counterpart Chinese Patent Application No. 1 201810618557.X.

* cited by examiner

DISPLAY APPARATUS AND COMPUTING APPARATUS INCLUDING THE SAME

CROSS-REFERENCE TO RELATED APPLICATION(S)

This application claims the benefit of and priority to Korean Patent Application No. 10-2017-0097325, filed on Jul. 31, 2017, the entirety of which is hereby incorporated by reference.

BACKGROUND

1. Technical Field

The present disclosure relates to a display apparatus and a computing apparatus including the same.

2. Discussion of the Related Art

In general, display apparatuses can be equipped in home appliances or electronic devices, such as televisions (TVs), monitors, notebook computers, smartphones, tablet computers, electronic organizers, electronic pads, wearable devices, watch phones, portable information devices, navigation devices, and automotive control display apparatuses, and are used as a screen for displaying an image. General display apparatuses include a display panel for displaying an image and a sound device for outputting a sound associated with the image.

However, in display apparatuses, such as TVs and monitors, because a sound output from a sound device travels to a rear side or a lower side of a display panel, sound quality is degraded due to interference between sounds reflected from a wall and the ground. As such, a viewer's immersion experience is reduced.

Moreover, in sound devices (e.g., speakers) included in general computing apparatuses, such as notebook computers or tablet computers, it is difficult to realize high sound quality. For example, a low band bass sound is not sufficient. Also, as system bodies are made lighter and smaller, it is difficult to achieve a low-pitched sound of 1 kHz or less and a high-pitched sound of 4 kHz or more. Furthermore, sound devices of general computing apparatuses are often disposed on a lower side of a keyboard and a bottom, a left side surface, and a right side surface of a body and are spaced apart from a screen. As such, a viewer's immersion experience is reduced due to a sense of difference (or mismatch) caused by a distance difference between an image and a sound. In other words, in speakers of general computing apparatuses, because an output direction of a sound is not a direction toward the ears of a viewer, a sound having a middle-high-pitched sound band of 2 kHz or more having strong directionality is not directly transferred to a viewer, and is lost or distorted.

SUMMARY

Accordingly, the present disclosure is directed to a display apparatus and a computing apparatus including the same that substantially obviate one or more of the issues due to limitations and disadvantages of the related art.

An aspect of the present disclosure is to provide a display apparatus and a computing apparatus including the same, which output a high-quality sound.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, there is provided a display apparatus, including: a display module including a display panel configured to display an image, a system rear cover covering a rear surface of the display module, a vibration plate between the system rear cover and the rear surface of the display module, and a vibration module configured to vibrate the vibration plate, wherein the display panel is further configured to vibrate based on a vibration of the vibration plate to output sound.

In another aspect, there is provided a display apparatus, including: a display module including a display panel configured to display an image, a vibration plate adjacent to a rear surface of the display module, a vibration module configured to vibrate the vibration plate, and a buffer member on the vibration plate and adjacent to the vibration module, the buffer member being configured to protect the vibration module, wherein the display panel is further configured to vibrate based on a vibration of the vibration plate to output sound.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

Figure 1:
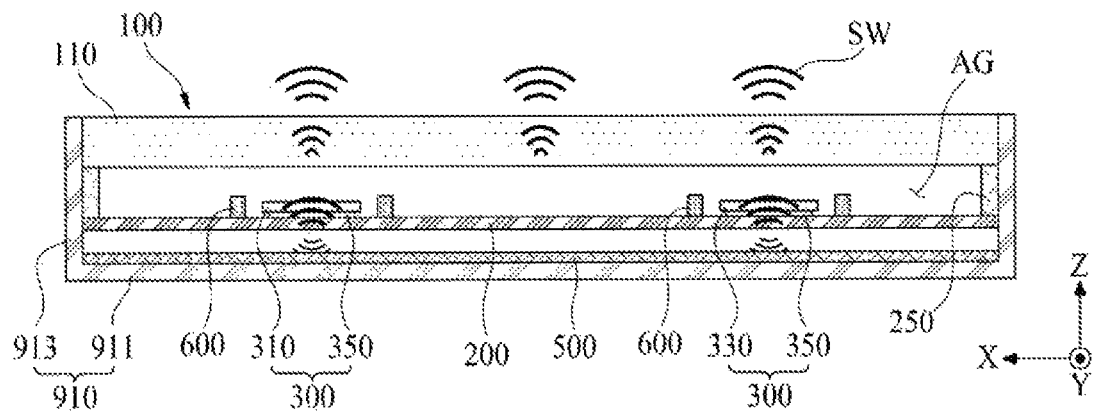
FIG. 1 is a cross-sectional view illustrating a display apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in a co-dependent relationship.

Hereinafter, embodiments of a display apparatus and a computing apparatus including the same according to the present disclosure will be described in detail with reference to the accompanying drawings. In adding reference numerals to elements of each of the drawings, although the same elements are illustrated in other drawings, like reference numerals may refer to like elements.

FIG. 1 is a cross-sectional view illustrating a display apparatus according to an embodiment of the present disclosure.

With reference to FIG. 1, a display apparatus according to an embodiment of the present disclosure may include a display module 100, a vibration plate 200, a vibration module 300, and a system rear cover 910. The display module 100 may include a display panel 110 configured to display an image. The display panel 110 may be one a flat display panel, such as a liquid crystal display panel, a light-emitting display panel, an electrophoresis display panel, a micro light-emitting diode display panel, a plasma display panel, an electro wetting display panel, and a quantum dot light-emitting display panel.

The vibration plate 200 may be connected to the display module 100. The vibration plate 200 may be disposed to face a rear surface of the display module 100. For example, the vibrating plate 200 may overlap the entire rear surface of the display module 100, or may overlap with all but a rear periphery of the display module 100.

The vibration plate 200 may be formed of one or more of: a magnesium (Mg) alloy material, a Mg-lithium (Li) alloy material, and an aluminum (Al) alloy material. For example, the Mg alloy material may include at least one of Al, zinc (Zn), and manganese (Mn). The Mg alloy material may be a lightest material of metal materials of a mechanical structure, may have relatively high non-rigidity (intensity/specific gravity) and relatively high vibration damping ability (ability to absorb and progressively reduce vibration), and may have good dimension stability with respect to a variation of a temperature and the elapse of time.

Because the vibration plate 200 may be formed of one or more of a Mg alloy material, a Mg—Li alloy material, and an Al alloy material, a fine sound may be realized due to a reactivity (a response time) of a fast sound based on a low density, and a sound having a whole sound band including a low-pitched sound band to a high sound band may be realized based on a fast sound speed due to high non-rigidity. Also, because internal loss may be large due to high vibration ability, undesired vibration does not occur. Thus, a residual sound and a reflected sound or a resonance sound may be suppressed, thereby enabling an original sound to be reproduced. Also, the vibration plate 200 may have high elasticity. Thus, a high-resolution tone of 40 kHz or more may be realized.

The vibration plate 200 may be disposed on the rear surface of the display module 100 using a plate fixing member 250, may cover the rear surface of the display module 100, and may be spaced apart from the rear surface of the display module 100. For example, the vibration plate 200 may have a thickness of 0.1 mm to 1.0 mm, e.g., for enhancing a sound having a high-pitched sound band. For example, if the thickness of the vibration plate 200 is less than 0.1 mm, it may be difficult to maintain flatness, and the vibration plate 200 may be torn when vibrating. On the other hand, if the thickness of the vibration plate 200 is more than 1.0 mm, the vibration plate 200 may be suitable for realizing a sound having a low-pitched sound band, rather than a sound having a high-pitched sound band.

The plate fixing member 250 may be disposed between a periphery of a front surface of the vibration plate 200 and the rear surface of the display module 100. Thus, the vibration plate 200 may be fixed to the rear surface of the display module 100, and an air gap AG may be provided between the rear surface of the display module 100 and the vibration plate 200. The air gap AG may be defined as a vibration space or a vibration gap that may enable the vibration plate 200 to vibrate, and may enable the display module 100 to vibrate based on the vibration of the vibration plate 200.

The plate fixing member 250 may include, for example, a double-sided tape or an adhesive resin. The double-sided tape may include a pad or a foam pad having a certain height (or a certain thickness). The adhesive resin may include an acryl-based material or a urethane-based material. In one example, to reduce a vibration of the vibration plate 200 directly transferred to the display module 100, the adhesive resin may include the urethane-based material having a relatively ductile or softness characteristic, rather than the acryl-based material.

The vibration module 300 may be disposed on the vibration plate 200, and may vibrate according to a sound driving signal input thereto to allow the vibration plate 200 to vibrate. The vibration module 300 may include a first vibration element 310 and a second vibration element 330.

The first vibration element 310 may be attached to one side of the vibration plate 200 by an element adhesive member 350. The second vibration element 330 may be attached to the other side of the vibration plate 200 by the element adhesive member 350. The element adhesive member 350 may include, e.g., a double-sided tape or a naturally curable adhesive. For example, the element adhesive member 350 may include a thermocurable adhesive or a photocurable adhesive. In this case, a characteristic of the vibration element 310 can be reduced by heat used in a curing process of curing the element adhesive member 350.

Each of the first vibration element 310 and the second vibration element 330 may be attached to a front surface of the vibration plate 200 to face the rear surface of the display module 100, with the air gap AG therebetween. In this case, to prevent the rear surface of the display module 100 from physically contacting the first and second vibration elements 310 and 330, which may be vibrating according to the sound driving signal input thereto, the first and second vibration elements 310 and 330 may be spaced apart from the rear surface of the display module 100 by a particular distance, and a separation distance between the display module 100 and each of the first and second vibration elements 310 and 330 may be adjusted based on a height (or a thickness) of the plate fixing member 250. Therefore, the plate fixing member 250 may be configured to have a height (or a thickness) that may be relatively greater than a distance between the front surface of the vibration plate 200 and a front surface of each of the first and second vibration elements 310 and 330, with respect to a thickness direction Z of a display apparatus, thereby preventing or avoiding the first and second vibration elements 310 and 330 from being damaged by a direct physical contact between the display module 100 and each of the first and second vibration elements 310 and 330. Alternatively, each of the first and second vibration elements 310 and 330 may be attached to a rear surface of the vibration plate 200 to face the system rear cover 910.

Each of the first and second vibration elements 310 and 330 may include a piezoelectric material layer having a piezoelectric effect, a first electrode disposed on a front surface of the piezoelectric material layer, and a second electrode disposed on a rear surface of the piezoelectric material layer. The piezoelectric material layer may include a piezoelectric material that may vibrate with an electric field. For example, the piezoelectric material may have a characteristic in which, as pressure is applied to or twisting occurs in a crystalline structure due to an external force, a potential difference is caused by dielectric polarization based on a relative position change of a positive (+) ion and a negative (−) ion, and vibration occurs due to an electric field based on an applied voltage.

The piezoelectric material of the first vibration element 310 may include one or more of: a ceramic piezoelectric material, a polymer piezoelectric material, and a semiconductor piezoelectric material, or a mixed material including two or more materials, and for example, may include a ceramic piezoelectric material having a broad frequency response characteristic. Examples of the ceramic piezoelectric material may include lead zirconate titanate (PZT) and barium titanate ($BaTiO_3$). An example of the polymer piezoelectric material may include polyvinylidene difluoride (PVDF). Examples of the semiconductor piezoelectric material may include zinc oxide (ZnO) and cadmium sulfide (CdS).

The first electrode and the second electrode may overlap each other, with the piezoelectric material layer therebetween. The first electrode and the second electrode may each include an opaque metal material that may be relatively low in resistance, and may have a good heat dissipation characteristic, but examples are not limited thereto. In other embodiments, the first electrode and the second electrode may each include a transparent conductive material and/or a conductive polymer material.

The system rear cover 910 may accommodate the display module 100 and the vibration plate 200 connected to the vibration module 300. The system rear cover 910 may include a bottom structure 911 and a sidewall structure 913. The bottom structure 911, which may be an outermost rear surface structure located on a rear surface of the display apparatus, may support a periphery of a rear surface of the display module 100, and may cover the rear surface of the vibration plate 200. The sidewall structure 913, which may be an outermost side surface structure located on a side surface of the display apparatus, may be provided in a periphery of the bottom structure 911, and may cover side surfaces of the display module 100 and side surfaces of the vibration plate 200.

The display apparatus according to an embodiment may further include a sound absorbing member 500. The sound absorbing member 500 may be on the rear surface of the vibration plate 200. The sound absorbing member 500 may be installed in the bottom structure 911 of the system rear cover 910 to face the rear surface of the vibration plate 200. The sound absorbing member 500 may include, for example, a nonwoven fabric or a foam pad. The sound absorbing member 500 may attenuate a resonance of a low sound occurring in the rear surface of the vibration plate 200, e.g., to reduce a booming phenomenon caused by interference between low sounds, thereby enhancing sound quality. Also, the sound absorbing member 500 may prevent the bottom structure 911 of the system rear cover 910 from directly contacting the vibration plate 200 when the vibration plate 200 vibrates, thereby preventing shaking of the display apparatus caused by the direct contact between the system rear cover 910 and the vibration plate 200.

The display apparatus according to an embodiment may further include a buffer member 600. The buffer member 600 may be installed in the vibration plate 200, and may be located near the vibration module 300. The buffer member 600 may include, for example, a foam pad. The buffer member 600 may prevent a direct physical contact between the vibration module 300 and the display module 100, thereby preventing the vibration module 300 from being damaged or broken due to the physical contact between the vibration module 300 and the display module 100. Accordingly, a top surface of the buffer member 600 may be located between a top surface of the vibration module 300 and the rear surface of the display module 100. That is, a height of the buffer member 600 may be set to be higher than that of the vibration module 300 with respect to the front surface of the vibration plate 200.

The buffer member 600 may have a polygonal shape, a circular shape, or an oval shape that surrounds the vibration module 300, for example, each of the first vibration element 310 and the second vibration element 330, but embodiments are not limited thereto. An oval shape may include an elliptical shape, an egg-shape, a rectangular shape with rounded corners, or other non-circular curved shape having a width different from its height. Embodiments are not limited to these examples. In other examples, the buffer member 600 may have a line or dot shape for preventing a direct physical contact between the display module 100 and each of the first vibration element 310 and the second vibration element 330.

The display apparatus according to an embodiment may include the vibration plate 200 that may vibrate along with a vibration of the vibration module 300 based on a sound driving signal input thereto, and the display module 100 that may vibrate based on the vibration of the vibration plate 200. Thus, the display apparatus may output sound (or sound wave) SW, generated based on the vibration of the display module 100, to a front direction of the display panel 110. That is, in the display apparatus according to an embodiment, when the vibration module 300 vibrates according to the sound driving signal, a sound pressure may be generated in the air gap AG by the vibration of the vibration plate 200 based on the vibration of the vibration module 300, the display module 100 may vibrate based on the sound pressure generated in the air gap AG, and the sound SW (generated by the vibration of the display panel 110 based on the vibration of the display module 100) may be output to a front direction of the display panel 110. In other words, because the display panel 110 may vibrate based on the vibration plate 200 caused by the vibration of the vibration module 300, the sound SW generated based on the vibration of the display panel 110 may be output to a front direction of the display panel 110, even without a separate speaker.

Therefore, the display apparatus according to an embodiment may output the sound SW, generated based on the vibration of the display panel 110, to a region in front of the display panel 110, instead of a region behind and/or under the display panel 110. Thus, a sound may be accurately transferred, thereby improving sound quality to increase a viewer's immersion experience. In the display apparatus according to an embodiment, because the display panel 110 may vibrate based on a vibration of the vibration plate 200 having a large area, a sound having high sound quality and a wide sound band may be output, and a sound field that fully fills a whole screen may be realized, whereby a viewer's immersion experience may be enhanced due to harmony (or match) between an image and a sound. Particularly, a sound having a middle-high-pitched sound band of 2 kHz to 20 kHz may have strong directionality. Thus, even if the sound were to be output toward the ears of a viewer, the sound may be transferred to the viewer without being lost or distorted. However, a sound having a middle-pitched and high-pitched sound band that is output from a lower speaker and/or a rear speaker equipped in a related art display apparatus cannot be normally transferred to a viewer due to the output direction thereof. On the other hand, in the display apparatus according to an embodiment, because a sound traveling toward the ears of a viewer is output from the display panel 110, a sound having a middle-high-pitched sound band may be directly transferred to the viewer without being lost or distorted. Thus, a sound substantially similar to an original sound may be provided to the viewer according to an embodiment.

Figure 2:
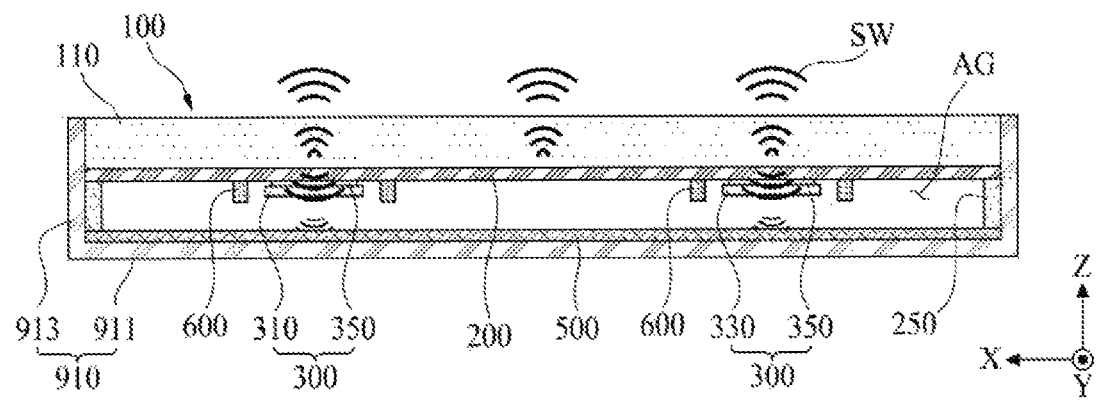
FIG. 2 is a cross-sectional view illustrating a display apparatus according to an embodiment of the present disclosure.

FIG. 2 is a cross-sectional view illustrating a display apparatus according to an embodiment of the present disclosure.

FIG. 2 illustrates a display apparatus implemented by modifying a disposition structure of a vibration plate. Thus, in the description below, only a vibration plate and elements relevant thereto will be described, and descriptions of other elements are omitted.

With reference to FIG. 2, in the display apparatus according to an embodiment, a vibration plate 200 may be directly connected to (or attached to) a rear surface of a display module 100. The vibration plate 200 may be supported by a plate fixing member 250. Alternatively, when the vibration plate 200 is attached to the display module 100, the plate fixing member 250 may be omitted. For example, the vibrating plate 200 may overlap the entire rear surface of the display module 100, or may overlap all but the periphery of the rear surface of the display module 100.

A vibration module 300 according to an embodiment may be attached to the rear surface of the vibration plate 200 facing a bottom structure 911 of a system rear cover 910, and may vibrate the vibration plate 200 according to a sound driving signal input thereto. The vibration module 300, as described above, may include a first vibration element 310 and a second vibration element 330. Each of the first and second vibration elements 310 and 330, as described above, may include a piezoelectric material layer having a piezoelectric effect, a first electrode disposed on a front surface of the piezoelectric material layer, and a second electrode disposed on a rear surface of the piezoelectric material layer.

With further reference to FIG. 2, it is possible to provide only one vibration element. The one vibration element may be attached on the rear surface of the vibration plate 200 facing the bottom structure 911 or the sound absorbing member 500, if it is applied there.

The display apparatus of the FIG. 2 example may have a similar effect as that of the display apparatus illustrated in the FIG. 1 example. In addition, a vibration of the vibration plate 200 having a large area may be directly transferred to the display module 100, whereby the display panel 110 may vibrate. Accordingly, a sound pressure level or a sound quality of sound SW may be further enhanced.

Figure 3:
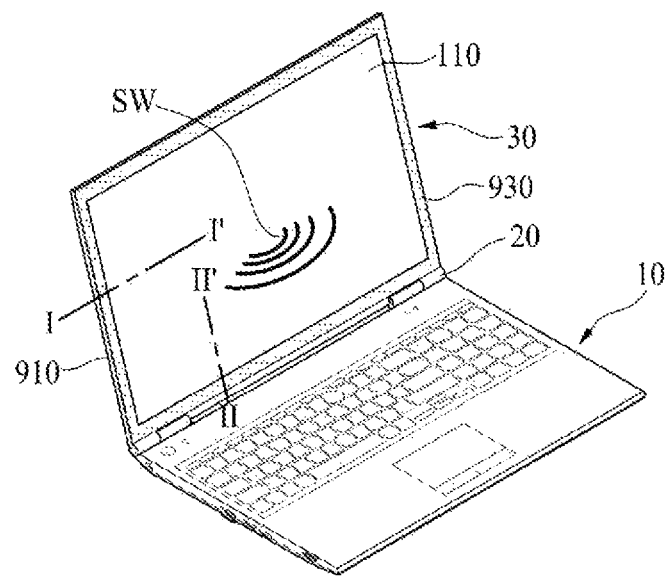
FIG. 3 is a perspective view illustrating a computing apparatus according to an embodiment of the present disclosure.
Figure 4:
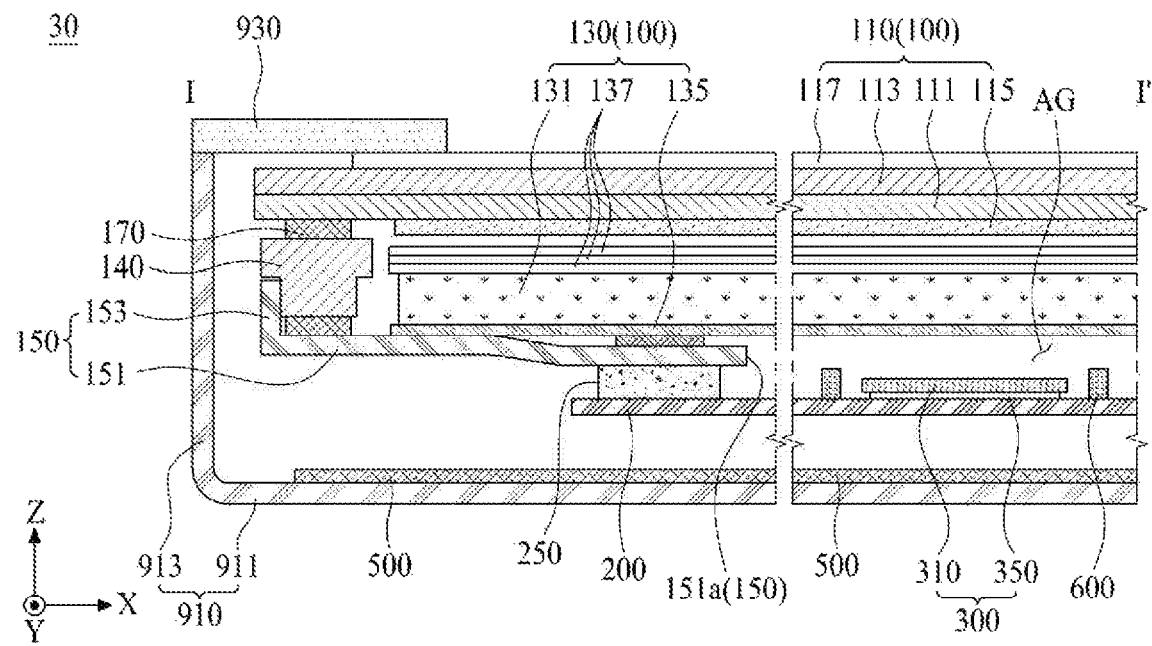
FIG. 4 is a cross-sectional view taken along line I-I' of FIG. 3.
Figure 5:
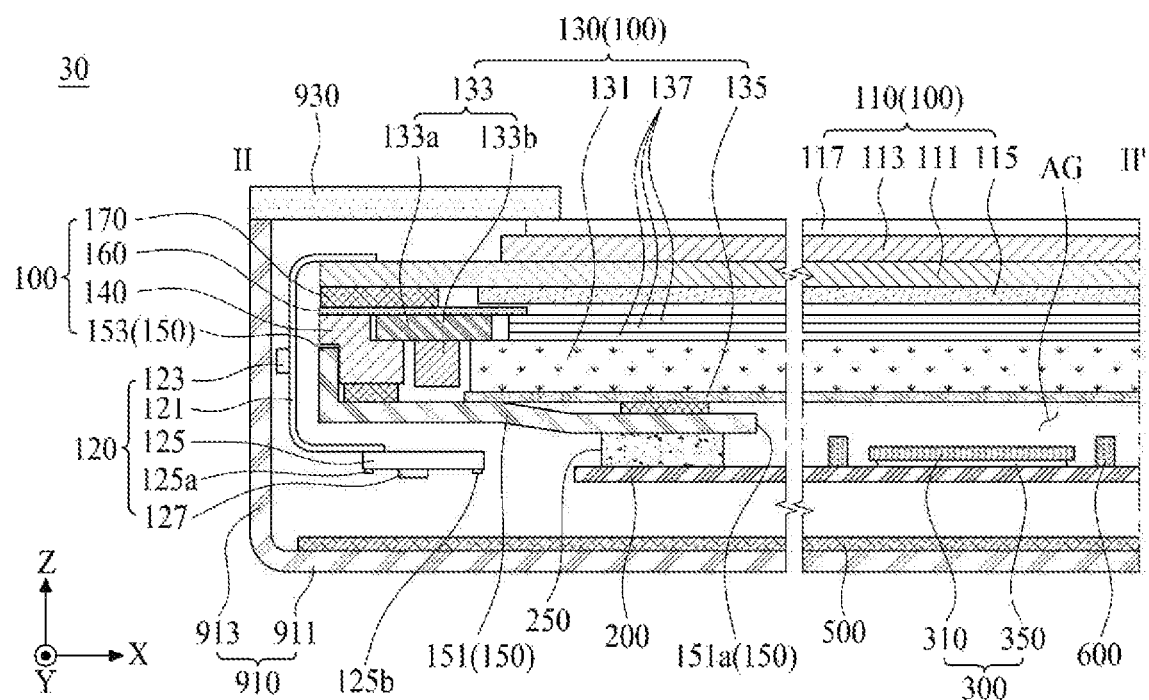
FIG. 5 is a cross-sectional view taken along line II-II' of FIG. 3.
Figure 6:
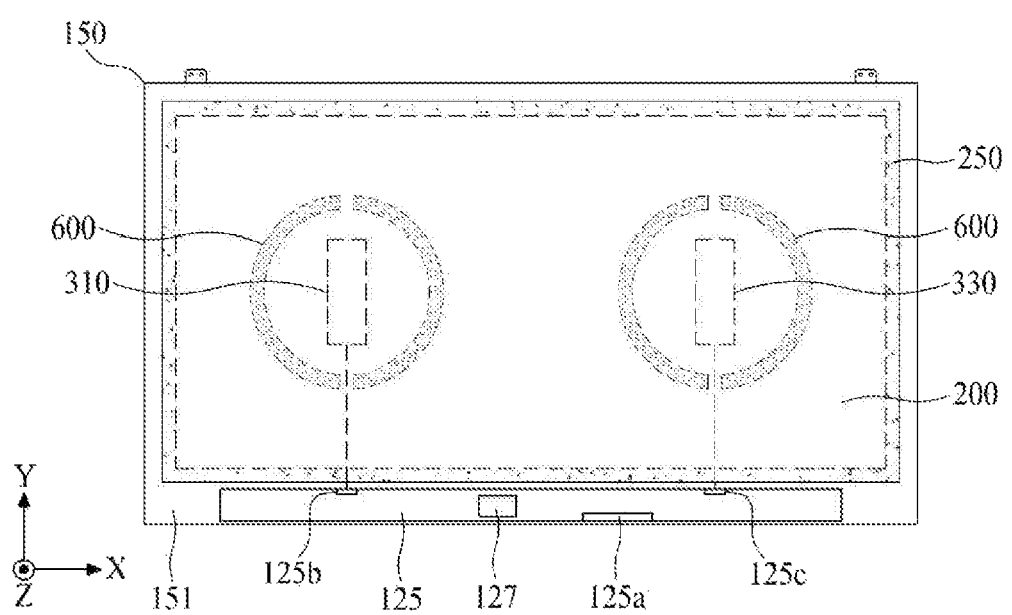
FIG. 6 is a rear view illustrating a rear surface of the display module of FIG. 4.

FIG. 3 is a perspective view illustrating a computing apparatus according to an embodiment of the present disclosure. FIG. 4 is a cross-sectional view taken along line I-I' of FIG. 3. FIG. 5 is a cross-sectional view taken along line II-II' of FIG. 3. FIG. 6 is a rear view illustrating a rear surface of the display module of FIG. 4.

With reference to FIGS. 3 to 6, the computing apparatus according to an embodiment may include a system body 10 and a display apparatus 30, that may be rotatable, connected to the system body 10 through a hinge part 20. The system body 10 may include a main board, various circuits mounted on the main board, various storage media, peripheral devices, a keyboard, a power device, etc. The various circuits mounted on the main board may include a central control circuit for processing various information, an image processing circuit for processing data according to control by the central control circuit, a sound processing circuit for processing a sound according to control by the central control circuit, etc. The system body 10 may process various information, may generate video data and a sound signal, and may provide the display apparatus 30 with the processed information and the generated video data and sound signal. The hinge part 20 may be installed between the system body 10 and the display apparatus 30, and may support, e.g., rotatably, a lower side of the display apparatus 30.

The display apparatus 30 may be rotatable, may be installed in the hinge part 20, and may cover a top surface of the system body 10 or may be unfolded by a particular angle from the top of the system body 10, e.g., with the hinge part 20 as a rotation shaft. The display apparatus 30 may display an image corresponding to video data provided from the system body 10, based on a timing control signal provided from the system body 10, and may output sound SW corresponding to a sound signal provided from the system body 10. For example, the sound signal may be synchronized with an image signal or not.

The display apparatus 30 according to an embodiment may include a display module 100, a vibration plate 200, a vibration module 300, a system rear cover 910, and a system front cover 930. The display module 100 may include a display panel 110, a panel driving circuit unit 120, a backlight unit 130, a panel guide 140, and a supporting cover 150. The display panel 110 may display an image by using light irradiated from the backlight unit 130 and may include a lower substrate 111, an upper substrate 113, a lower polarization member 115, and an upper polarization member 117.

The lower substrate 111, e.g., a thin film transistor (TFT) array substrate, may include a pixel array, including a plurality of pixels respectively provided in a plurality of pixel areas defined by intersections of a plurality of gate lines and a plurality of data lines. Each of the plurality of pixels may include a TFT connected to a gate line and a data line corresponding thereto, a pixel electrode connected to the TFT, and a common electrode adjacent to the pixel electrode and supplied with a common voltage. The lower substrate 111 may further include a pad part provided in a first periphery thereof and a gate driving circuit provided in a second periphery thereof.

The pad part may provide the pixel array and the gate driving circuit with a signal supplied from the outside. For example, the pad part may include a plurality of data pads connected to the plurality of data lines through a plurality of data link lines and a plurality of gate input pads connected to the gate driving circuit via a gate control signal line.

The gate driving circuit may be embedded (or integrated) into the first periphery of the lower substrate 111 to be connected to the plurality of gate lines in a one-to-one relationship. For example, the gate driving circuit may be a shift register, which may include a transistor formed through the same process as a process of forming a TFT provided in each of the pixel areas. Alternatively, the gate driving circuit may be provided in the panel driving circuit 120 without being embedded into the lower substrate 111.

The upper substrate 113, e.g., a color filter array substrate, may include a pixel defining pattern that may define an opening area overlapping each of the pixel areas provided on the lower substrate 111 and a color filter layer provided in the opening area. The upper substrate 113 may be attached to the lower substrate 111 with a liquid crystal layer therebetween by using a sealant. The liquid crystal layer may be between the lower substrate 111 and the upper substrate 113, and may include a liquid crystal including liquid crystal molecules having an alignment direction that may be changed based on an electric field generated from the common voltage and a data voltage applied to the pixel electrode in each of the plurality of pixels.

The lower polarization member 115 may be attached to a lower surface of the lower substrate 111, and may polarize light, e.g., irradiated from the backlight unit 130, to a first polarization axis to irradiate the polarized light onto the lower substrate 111. The upper polarization member 117 may be attached to an upper surface of the upper substrate 113, and may polarize light that passes through the upper substrate 113 and may be output to the outside. The display panel 110 may drive the liquid crystal layer according to the electric field generated from the common voltage and the data voltage applied to each of the plurality of pixels, thereby displaying an image by using light passing through the liquid crystal layer.

The panel driving circuit unit 120 may be connected to the pad part provided in the display panel 110, and may display an image, e.g., corresponding to the video data supplied from the system body 10, on each pixel. The panel driving circuit unit 120 may include a plurality of data flexible circuit films 121, a plurality of data driving integrated circuits (ICs) 123, a printed circuit board (PCB) 125, and a timing control circuit 127.

Each of the plurality of data flexible circuit films 121 may be attached to the pad part provided on the lower substrate 111 of the display panel 110 by a film attachment process. Each of the plurality of data flexible circuit films 121 may be bent to surround a side of each of the display panel 110 and the backlight unit 130 and may be connected to the PCB 125 at a rear surface of the supporting cover 150.

Each of the plurality of data driving ICs 123 may be individually mounted on a corresponding data flexible circuit film of the plurality of data flexible circuit films 121. Each of the plurality of data driving ICs 123 may receive pixel data and a data control signal supplied from the timing control circuit 127, may convert the pixel data into a pixel-based analog data signal according to the data control signal, and may supply the analog data signal to a corresponding data line.

Alternatively, each of the plurality of data driving ICs 123 may be directly mounted on the first periphery of the lower substrate 111, and may be connected to a plurality of data lines. In this case, in one example, the plurality of data flexible circuit films 121 may be omitted.

The PCB 125 may be connected to the plurality of data flexible circuit films 121. The PCB 125 may support the timing control circuit 127, and may transfer signals and power between elements of the panel driving circuit unit 120. The PCB 125 may include a user connector 125a, connected to the system body 10 through a cable, and first and second sound output connectors 125b and 125c connected to the vibration module 300.

The timing control circuit 127 may be mounted on the PCB 125, and may receive, through the user connector 125a of the PCB 125, the video data and a timing synchronizing signal supplied from the system body 10. The timing control circuit 127 may align the video data according to a pixel arrangement structure to generate pixel data, based on the timing sync signal, and may supply the generated pixel data to the data driving ICs 123. Also, the timing control circuit 127 may generate the data control signal and a gate control signal, based on the timing synchronizing signal. Thus, the timing control circuit 127 may control a driving timing of each of the plurality of data driving ICs 123 by using the data control signal, and may control a driving timing of the gate driving circuit by using the gate control signal.

Additionally, the panel driving circuit unit 120 may further include a plurality of gate flexible circuit films and a plurality of gate driving ICs. For example, the lower substrate 111 of the display panel 110 may further include a gate pad part that may be provided in a third periphery thereof, and may include a plurality of gate pads connected to a plurality of gate lines through a plurality of gate link lines. Each of the plurality of gate flexible circuit films may be attached to the gate pad part provided on the lower substrate 111 of the display panel 110 by a film attachment process. Each of the plurality of gate flexible circuit films may be bent to a side surface of the display panel 110. Each of the plurality of gate driving ICs may be individually mounted on a corresponding gate flexible circuit film of the plurality of gate flexible circuit films. Each of the plurality of gate driving ICs may receive the gate control signal supplied from the timing control circuit 127 through a gate input pad, may generate a gate pulse according to the gate control signal, and may supply the gate pulse to the gate lines in a particular order.

Alternatively, each of the plurality of gate driving ICs may be directly mounted on the third periphery of the lower substrate 111 by a chip bonding process, may be connected to a plurality of gate lines, and may be connected to the gate input pad provided on the lower substrate 111. In this case, for example, the plurality of gate flexible circuit films may be omitted.

The backlight unit 130 may be on a rear surface of the display panel 110, and may irradiate light onto the rear surface of the display panel 110. The backlight unit 130 may include a light guide plate 131, a light source unit 133, a reflective sheet 135, and an optical sheet part 137.

The light guide plate 131 may include a light incident surface that may overlap the display panel 110, and may be provided on one sidewall thereof. The light guide plate 131 may include a light-transmitting plastic or glass material. The light guide plate 131 may transfer (or output) light, which may be incident through the light incident surface from the light source unit 133, to the display panel 110.

The light source unit 133 may irradiate light onto the light incident surface provided in the light guide plate 131. The light source unit 133 may include a light source PCB 133a and a plurality of light-emitting diodes (LEDs) 133b that may be mounted on the light source PCB 133a and may irradiate light onto the light incident surface of the light guide plate 131. The light source unit 133 may be covered by a light source housing. The light source housing may cover a front surface of the panel guide 140 and a periphery of the optical sheet part 137, which may be adjacent to each other with the light source unit 133 therebetween, and may cover an upper portion of the light source unit 133.

The reflective sheet 135 may cover a rear surface of the light guide plate 131. The reflective sheet 135 may reflect light, which may be incident from the light guide plate 131, toward the light guide plate 131, e.g., to reduce the loss of the light.

The optical sheet part 137 may be disposed on a front surface of the light guide plate 131, and may enhance luminance characteristic of light output from the light guide plate 131. The optical sheet part 137 may include a lower diffuser sheet, a lower prism sheet, and an upper prism sheet, but embodiments are not limited thereto. For example, the optical sheet part 137 may be configured by a stacked combination of one or more sheets among a diffuser sheet, a prism sheet, a dual brightness enhancement film (DBEF), and a lenticular sheet, or may be configured with one composite sheet having a light diffusing function and a light collecting function. According to an embodiment, because a sound may be output based on a vibration of the display panel 110, which may respond to a vibration of the vibration plate 200, the loss of vibration performed in the vibration plate 200 may be reduced while the vibration is being transferred to the display panel 110. Accordingly, the optical sheet part according to an embodiment may be configured with one composite sheet having the light diffusing function and the light collecting function.

The panel guide 140 may be accommodated into the supporting cover 150, and may support the light source unit 133 and a periphery of a rear surface of the display panel 110. The panel guide 140 may include a panel supporting part that may support the periphery of the rear surface of the display panel 110, and a cover connection part that may be recessed from an outer surface of the panel supporting part.

The supporting cover 150 may support the panel guide 140. The supporting cover 150 may be formed of, e.g., a metal material, a plastic material, and/or the like. For example, to secure a rigidity of an LCD device and may dissipate heat of the backlight unit 130, the supporting cover 150 may be formed of a metal material.

The supporting cover 150 may include a cover plate 151 and a cover sidewall 153. The cover plate 151 may cover a rear surface of the backlight unit 130. Thus, the cover plate 151 may support the reflective sheet 135 of the backlight unit 130 and the panel guide 140. In one example, the panel guide 140 may be attached to the cover plate 151 by a double-sided tape.

The cover sidewall 153 may be vertically provided from a periphery of a front surface of the cover plate 151, and may surround an outer surface of the panel guide 140. In one example, the cover sidewall 153 may be inserted into the cover connection part provided in the panel guide 140.

The cover plate 151 may include a center opening 151a that may overlap a portion other than a periphery of a rear surface of the display panel 110 or a periphery of a rear surface of the backlight unit 130. For example, the cover plate 151 may overlap the periphery of the rear surface of the display panel 110 or the periphery of the rear surface of the backlight unit 130, and a weight of the cover plate 151 may be reduced in proportion to a size of the center opening 151a. In one example, a double-sided tape may be disposed between the cover plate 151 and the reflective sheet 135.

Additionally, the display module 100 may further include a light blocking member 160. The light blocking member 160 may cover a front surface of the panel guide 140 adjacent to the light source unit 133, the light source PCB 133a of the light source unit 133, and a periphery of the optical sheet part 137 adjacent to the light source unit 133, thereby reducing or preventing the light leakage of the light source unit 133. One side of the light blocking member 160 may extend to cover a side surface of the panel guide 140 adjacent to the light source unit 133, the cover sidewall 153 of the supporting cover 150, and a periphery of a rear surface of the cover plate 151. The light blocking member 160 may be a single-sided tape, e.g., having a dark or black color.

The display module 100 may further include a panel connection member 170. The panel connection member 170 may be between the periphery of the rear surface of the display panel 110 and the panel guide 140, and may attach the display panel 110 on the panel guide 140. That is, the display panel 110 may be attached to the panel guide 140 by the panel connection member 170. For example, the panel connection member 170 overlapping the light source unit 130 may be attached to the light blocking member 160. The panel connection member 170 may be, e.g., a double-sided tape or a double-sided foam tape.

The display module 100 may display an image by using light provided to the display panel 110 by the backlight unit 130 and may output sound SW, generated based on a vibration of the display panel 110 responding to a vibration of the vibration plate 200, to a front direction of the display panel 110, e.g., toward a face of a viewer. For example, the display module 100 may have a thin (or slim) structure having a thickness of 4 mm or less to have the same vibration amount as that of the vibration plate 200.

The vibration plate 200 may be connected to the rear surface of the display module 100. That is, the vibration plate 200 may be connected to the rear surface of the supporting cover 150 by the plate fixing member 250, and may cover the opening 151a of the supporting cover 150. Thus, the vibrating plate 200 may overlap all of the rear surface of the display module 100, except for the periphery of the rear surface of the display module 100. The vibration plate 200, as described above, may be formed of, e.g., one or more of: a Mg alloy material, a Mg—Li alloy material, and an Al alloy material, but a repetitive description relevant thereto is omitted.

The plate fixing member 250 may be disposed between the cover plate 151 of the supporting cover 150 and the vibration plate 200 to support the vibration plate 200, and may provide an air gap AG between the display module 100 (e.g., the reflective sheet 135) and the vibration plate 200. The air gap AG may be defined as a vibration space or a vibration gap for enabling a vibration of the vibration plate 200.

The vibration module 300 may be disposed on a front surface of the vibration plate 200 to face the reflective sheet 135 of the backlight unit 130 through the opening 151a of the supporting cover 150. The vibration module 300 may vibrate according to a sound driving signal that may be directly input from the system body 10, or may be indirectly input through the PCB 125 of the display module 100, thereby allowing the vibration plate 200 to vibrate. The vibration module 300 may include a first vibration element 310 and a second vibration element 330, which may be attached to the front surface of the vibration plate 200 by an element adhesive member 350. The first vibration element 310 and the second vibration element 330 may each include a piezoelectric material layer, e.g., as described above. Thus, their detailed descriptions are omitted.

The rear surface of the vibration plate 200 may be equally divided into first to third regions. For example, a center of the first vibration element 310 may be disposed in a center of the first region of the vibration plate 200, and a center of the second vibration element 330 may be disposed in a center of the third region of the vibration plate 200. That is, the first vibration element 310 and the second vibration element 330 may be disposed to be symmetrical about a center of the vibration plate 200, but may be asymmetrical, without being limited thereto.

The system rear cover 910 may accommodate the display module 100 and the vibration plate 200 connected to the vibration module 300. The system rear cover 910 may include a bottom structure 911 and a sidewall structure 913.

The bottom structure 911, which may be an outermost rear structure disposed on a rear surface of the display apparatus, may support a periphery of a rear surface of the supporting cover 150, and may cover the rear surface of the vibration plate 200. For example, the bottom structure 911 may be spaced apart from the vibration plate 200 by a particular distance, to not directly physically contact the vibration plate 200 when the vibration plate 200 vibrates.

The sidewall structure 913, which may be an outermost side structure disposed on a side surface of the display apparatus, may be provided in a periphery of the bottom structure 911, and may cover side surfaces of the display module 100 and side surfaces of the vibration plate 200.

The system front cover 930 may be disposed to cover a periphery of a front surface of the display panel 110. That is, the system front cover 930 may conceal a non-display area of the display panel 110 and the panel driving circuit unit 120. The system front cover 930 may be connected to the sidewall structure 913 of the system rear cover 910 by a fastening member, such as a hook, and may cover a front surface of the display module 100 other than a display area of the display panel 110.

The display apparatus according to an embodiment may further include a sound absorbing member 500. The sound absorbing member 500 may be on the rear surface of the vibration plate 200. The sound absorbing member 500 may be on the bottom structure 911 of the system rear cover 910 to face the rear surface of the vibration plate 200 and may be as described above. Thus, a detailed description thereof is omitted.

Moreover, the display apparatus according to an embodiment may further include a buffer member 600. The buffer member 600 may be on the vibration plate 200, and may be located near the first and second vibration elements 310 and 330. A height of the buffer member 600 may be set to be higher than that of the first and second vibration elements 310 and 330 with respect to the front surface of the vibration plate 200. The buffer member 600 may include a foam pad, and may have a polygonal shape, a circular shape, or an oval shape that may surround the first and second vibration elements 310 and 330, but embodiments are not limited thereto. For example, the buffer member 600 may have a line or dot shape for avoiding or preventing a direct physical contact between the reflective sheet 135 of the backlight unit 130 and each of the first vibration element 310 and the second vibration element 330.

Figure 7:
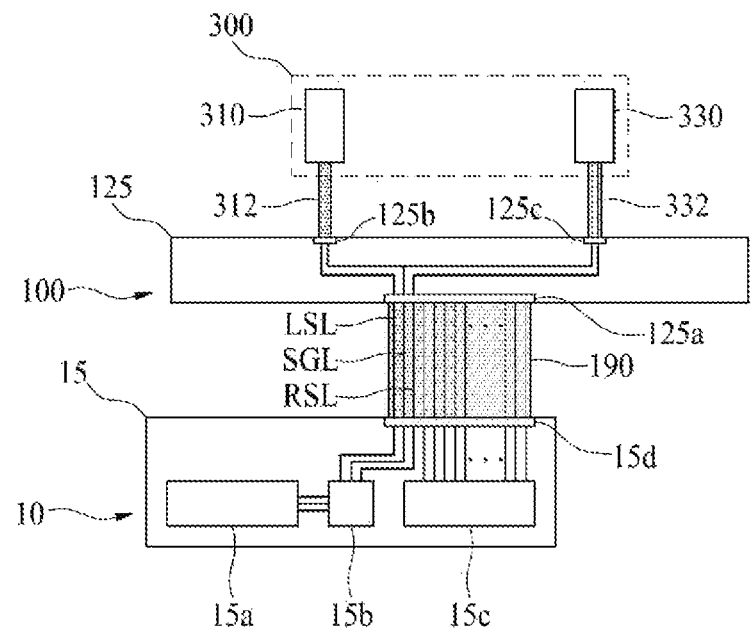
FIG. 7 is a diagram illustrating a circuit connection structure of a system body, a printed circuit board, and a vibration module, according to an embodiment of the present disclosure.

FIG. 7 is a diagram illustrating a circuit connection structure of a system body, a printed circuit board, and a vibration module, according to an embodiment of the present disclosure.

With reference to FIG. 7, along with FIG. 3, in a computing apparatus according to an embodiment, a system body 10 may generate a sound driving signal, and may supply the sound driving signal to a vibration module 300 through a display module 100. That is, the vibration module 300 may be driven by the sound driving signal supplied through the display module 100 from the system body 10.

A main board 15 of the system body 10 may include a sound processing circuit 15a, an audio amplifier 15b, a video processing circuit 15c, and a system connector 15d. The sound processing circuit 15a may generate a sound signal, e.g., from digital sound data according to control by a center control circuit. The sound processing circuit 15a may be implemented as a sound card.

The audio amplifier 15b may amplify the sound signal supplied from the sound processing circuit 15a to generate the sound driving signal. The audio amplifier 15b may amplify a sound line input signal supplied from the sound processing circuit 15a, e.g., to an earphone terminal mounted on the main board 15 to generate the sound driving signal. The sound driving signal may be supplied to the system connector 15d provided on the main board 15.

In one example, the sound driving signal may include a left sound driving signal, e.g., including a positive left sound driving signal and a negative left sound driving signal; and a right sound driving signal, e.g., including a positive right sound driving signal and a negative right sound driving signal. In another example, the sound driving signal may include a positive left sound driving signal, a positive right sound driving signal, and a negative ground signal. However, embodiments are not limited thereto.

The video processing circuit 15c may generate video data from an image source, and may output the video data to the system connector 15d. The system connector 15d may include a plurality of display signal terminals and a plurality of audio signal terminals. For example, the display signal terminals may include a plurality of data interface signal terminals, e.g., for supplying a PCB 125 with the video data generated by the video processing circuit 15c, a plurality of panel driving power terminals, and a plurality of backlight driving power terminals. The audio signal terminals may include a plurality of sound output terminals for supplying the PCB 125 with the sound driving signal generated by the audio amplifier 15b.

The system connector 15d may be connected to the PCB 125 of the display module 100 through a user cable 190. The user cable 190 may include a plurality of signal lines respectively connected to the terminals provided in the system connector 15d. For example, the user cable 190 may include a left sound signal line LSL, a right sound signal line RSL, and a sound ground signal line SGL, which may be connected to the sound output terminals of the system connector 15d.

The PCB 125 of the display module 100 may include the user connector 125a, a first sound output connector 125b, and a second sound output connector 125c. The user connector 125a may be connected to the system connector 15d of the main board 15 through the user cable 190, and may receive, through the user cable 190, various signals, including a sound signal supplied from the main board 15.

The first sound output connector 125b may be connected to the user connector 125a, e.g., through a signal transfer line provided on the PCB 125, and may output the left sound driving signal, supplied through the user connector 125a, to a first vibration element 310. The first sound output connector 125b may be connected to the first vibration element 310, e.g., through a first flexible circuit cable 312. Therefore, the first vibration element 310 may vibrate based on an electric field, which may be generated based on the positive left sound driving signal and the negative left sound driving signal, or based on the positive left sound driving signal and the negative ground signal supplied through the first flexible circuit cable 312 from the first sound output connector 125b, thereby allowing a vibration plate to vibrate.

The second sound output connector 125c may be connected to the user connector 125a, e.g., through the signal transfer line provided on the PCB 125, and may output the right sound driving signal, supplied through the user connector 125a, to a second vibration element 330. The second sound output connector 125c may be connected to the second vibration element 330, e.g., through a second flexible circuit cable 332. Therefore, the second vibration element 330 may vibrate based on an electric field, which may be generated based on the positive right sound driving signal and the negative right sound driving signal, or based on the positive right sound driving signal and the negative ground signal supplied through the second flexible circuit cable 332 from the second sound output connector 125c, thereby allowing the vibration plate to vibrate.

According to an embodiment, the sound driving signal may be supplied to the vibration module 300 through the PCB 125 of the display module 100 and the user cable 190 connected between the display module 100 and the main board 15. Thus, even without a separate cable, the sound driving signal may be supplied to the vibration module 300.

The flexible circuit cables 312 and 332 of the vibration module 300 may be directly connected to the main board 15 without being connected to the PCB 125 of the display module 100. For example, the vibration module 300 may be driven according to the sound driving signal output from the audio amplifier 15b of the main board 15. However, if the flexible circuit cables 312 and 332 of the vibration module 300 are directly connected to the main board 15, the flexible circuit cables 312 and 332 of the vibration module 300 may be connected to the main board 15 in the system body 10 through the hinge part 20. As such, the cost may increase due to the increase in length of each of the flexible circuit cables 312 and 332, causing a reduction in assembly between the system body 10 and the display apparatus 30. Therefore, as described above, the flexible circuit cables 312 and 332 of the vibration module 300 may be connected to the PCB 125 of the display module 100.

Figure 8:
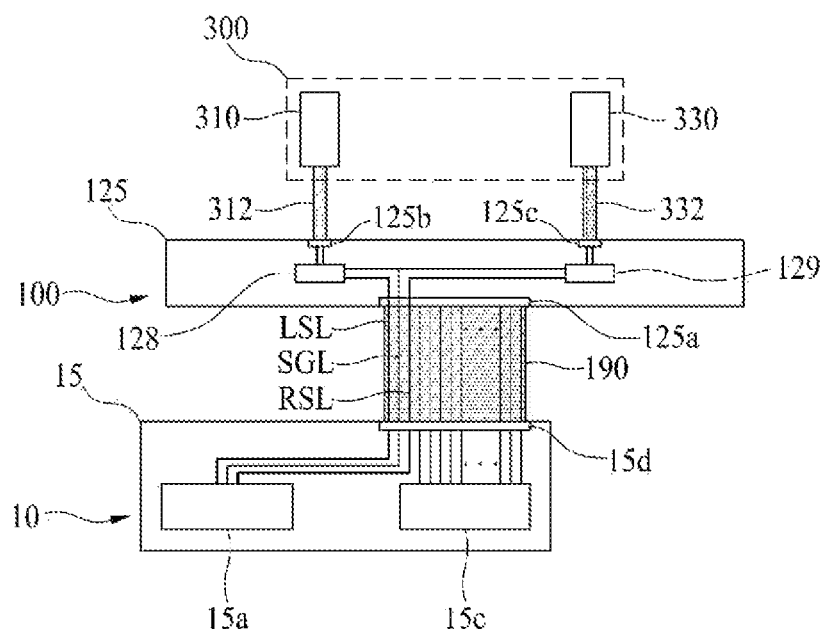
FIG. 8 is a diagram illustrating a circuit connection structure of a system body, a printed circuit board, and a vibration module, according to an embodiment of the present disclosure.

FIG. 8 is a diagram illustrating a circuit connection structure of a system body, a printed circuit board, and a vibration module, according to an embodiment of the present disclosure.

FIG. 8 illustrates an example that may be implemented by modifying a disposed position of the audio amplifier illustrated in FIG. 7. Thus, in description below, only an audio amplifier and elements relevant thereto will be described, and descriptions of other elements are omitted.

With reference to FIG. 8, along with FIG. 3, in a computing apparatus according to an embodiment, a display module 100 may generate a sound driving signal, and may supply the sound driving signal to a vibration module 300. That is, the vibration module 300 may be driven by the sound driving signal generated and supplied by the display module 100.

A main board 15 of a system body 10 according to an embodiment may include a sound processing circuit 15a, a video processing circuit 15c, and a system connector 15d. The main board 15 of the FIG. 8 example may not include the audio amplifier of the main board illustrated in the FIG. 7 example, and may supply a sound signal generated by the sound processing circuit 15a to the display module 100 through the system connector 15d without amplifying the sound signal. Therefore, the main board 15 according to an embodiment may supply the display module 100 with the sound signal generated by the sound processing circuit 15a and two or more audio driving voltages and two or more audio ground voltages for driving the vibration module 300. Accordingly, audio signal terminals of the system connector 15d may further include two or more audio driving voltage terminals and two or more audio ground voltage terminals.

A PCB 125 of the display module 100 may include a user connector 125a, a first audio amplifier 128, a second audio amplifier 129, a first sound output connector 125b, and a second sound output connector 125c.

The user connector 125a may be connected to the system connector 15d of the main board 15, e.g., through a user cable 190, and may receive, e.g., through the user cable 190, various signals, including a sound signal supplied from the main board 15.

The first audio amplifier 128 may be connected to the user connector 125a, e.g., through a signal transfer line provided on the PCB 125. In one example, the first audio amplifier 128 may receive a left sound signal, two or more audio driving voltages, and two or more audio ground voltages supplied through the user connector 125a, and may amplify the left sound signal by using the received two or more audio driving voltages and two or more audio ground voltages to generate a left sound driving signal. In another example, the first audio amplifier 128 may receive the left sound signal and two or more backlight driving voltages supplied through the user connector 125a, and may amplify the left sound signal by using the received two or more backlight driving voltages to generate the left sound driving signal. For example, the main board 15 may receive the two or more audio driving voltages and the two or more audio ground voltages, and may not output the received two or more audio driving voltages and two or more audio ground voltages to the system connector 15d. Thus, the number of terminals between the system connector 15d and the user connector 125a may be reduced.

The second audio amplifier 129 may be connected to the user connector 125a through the signal transfer line provided on the PCB 125. In one example, the second audio amplifier 129 may receive a right sound signal, two or more audio driving voltages, and two or more audio ground voltages supplied through the user connector 125a, and may amplify the right sound signal by using the received two or more audio driving voltages and two or more audio ground voltages to generate a right sound driving signal. In another example, the second audio amplifier 129 may receive the right sound signal and two or more backlight driving voltages supplied through the user connector 125a, and may amplify the right sound signal by using the received two or more backlight driving voltages to generate the right sound driving signal.

The first sound output connector 125b may be connected to the first audio amplifier 128, e.g., through the signal transfer line provided on the PCB 125, and may output the left sound driving signal, supplied from the first audio amplifier 128, to a first vibration element 310. The first sound output connector 125b may be connected to the first vibration element 310, e.g., through a first flexible circuit cable 312. Therefore, the first vibration element 310 may vibrate based on an electric field that may be generated based on a positive left sound driving signal and a negative left sound driving signal, or based on the positive left sound driving signal and a negative ground signal supplied through the first flexible circuit cable 312 from the first sound output connector 125b, thereby allowing a vibration plate to vibrate.

The second sound output connector 125c may be connected to the second audio amplifier 129, e.g., through the signal transfer line provided on the PCB 125, and may output a right sound driving signal, supplied from the second audio amplifier 129, to a second vibration element 330. The second sound output connector 125c may be connected to the second vibration element 330, e.g., through a second flexible circuit cable 332. Therefore, the second vibration element 330 may vibrate based on an electric field that may be generated based on a positive right sound driving signal and a negative right sound driving signal, or based on the positive right sound driving signal and a negative ground signal supplied through the second flexible circuit cable 332 from the second sound output connector 125c, thereby allowing the vibration plate to vibrate.

According to an embodiment, because the audio amplifiers 128 and 129 for generating the sound driving signal may be mounted on the PCB 125, the loss of the sound driving signal transferred from the main board 150 to the PCB 125 of the display module 100 may be reduced, and signal interference between the sound driving signal and a display signal occurring in the user cable 190 may be reduced, thereby reducing distortion of the display signal.

Figure 9:
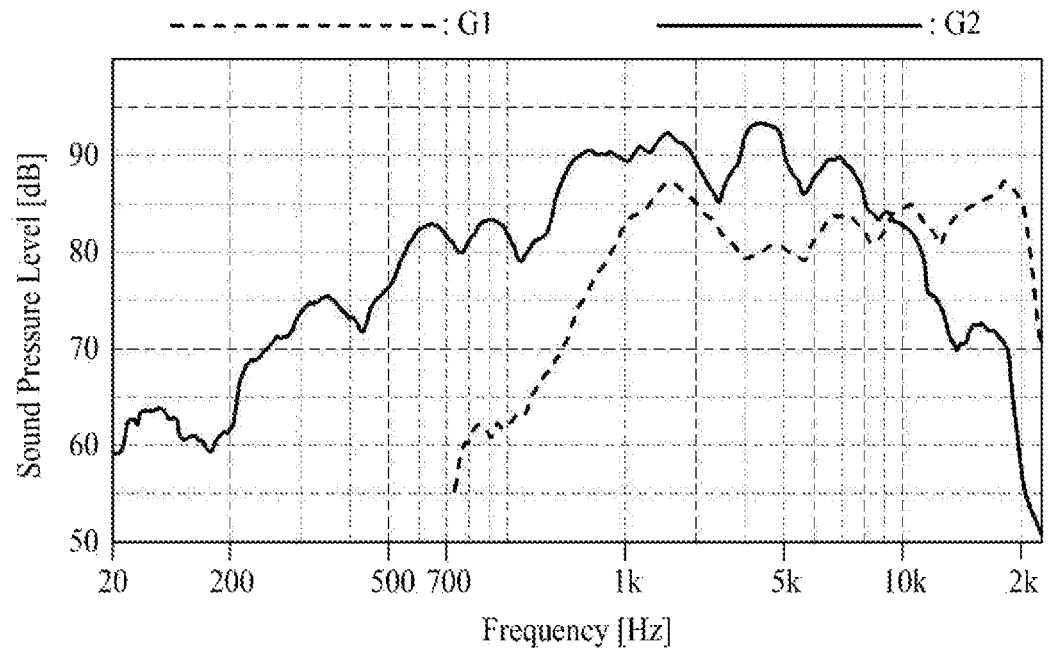
FIG. 9 is a graph illustrating sound output characteristics of a computing apparatus of a comparative example and an embodiment of the present disclosure.

FIG. 9 is a graph illustrating sound output characteristics of a computing apparatus of a comparative example and an embodiment of the present disclosure.

In FIG. 9, the abscissa axis (x-axis) represents a frequency, and the ordinate axis (y-axis) represents a sound pressure level. For example, the computing apparatus of the comparative example is a simulation result of LGTM Notebook Gram 15.

In FIG. 9, a first graph G1 shows a sound output characteristic of an embedded speaker mounted on each of a left side and a right side of a system body in the computing apparatus of the comparative example, and a second graph G2 shows a sound output characteristic based on a vibration of a display panel responding to a vibration of a large-area vibration plate included in the computing apparatus according to an embodiment of the present disclosure.

As in the first graph G1 and the second graph G2, it can be confirmed that the computing apparatus according to an embodiment of the present disclosure realizes a sound pressure level, which is higher than the comparative example by 6 dB or more, and an extended sound band reproduction width.

In an embodiment of the present disclosure, the display panel (e.g., the display panel 110) may vibrate based on a vibration of the large-area vibration plate (e.g., the vibration plate 200). Thus, a sound having a broad sound band may be output based on the vibration of the display panel. In an embodiment of the present disclosure, because the vibration plate having a large area corresponding to a size of the display panel is used, a high-quality sound having a high sound pressure may be output in comparison with a voice coil type speaker using a small vibration plate. For example, in an embodiment of the present disclosure, a portion or a whole portion of the display panel having a large area may vibrate based on a vibration of the large-area vibration plate including, e.g., one or more of: a Mg alloy material, a Mg—Li alloy material, or an Al alloy material, which has high non-rigidity and high vibration damping ability. Accordingly, in an embodiment of the present disclosure, a sound having a low-pitched sound band may be output, and a sound pressure level increases in a middle-high-pitched sound band (for example, 500 Hz or more) to largely enhance a sound output characteristic in the middle-high-pitched sound band, thereby outputting a full sound in all sound bands.

Further, in an embodiment of the present disclosure, because the display panel facing a face of a viewer outputs a sound toward the ears of the viewer, a sound having a middle-high-pitched sound band of 2 kHz or more having strong directionality may be directly transferred to the viewer. Thus, a sound substantially similar to an original sound may be provided to the viewer, thereby increasing the viewer's immersion experience.

Moreover, in an embodiment of the present disclosure, because a sound may be output based on a vibration of the display panel, even without a speaker embedded into a system body, an embedded speaker embedded into the system body may be removed. Thus, a weight of the system body (e.g., the system body 10) may be reduced. Also, a space obtained by removing the embedded speaker may be used, for example, as a space where a battery may be provided, thereby enabling the increase in size of the battery or other parts.

FIGS. 10 to 13 are cross-sectional views taken along line of FIG. 3, illustrating various examples.

Figure 10:
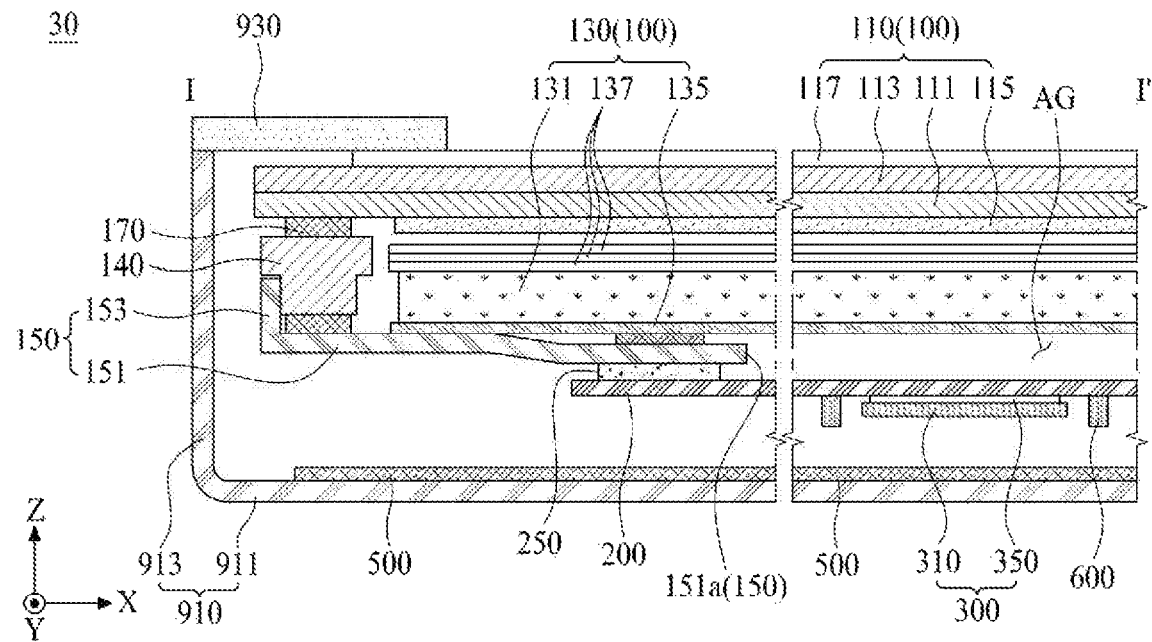
FIGS. 10 to 13 are cross-sectional views taken along line I-I' of FIG. 3, illustrating various examples.

FIG. 10 is another cross-sectional view taken along line of FIG. 3, and illustrates an embodiment that may be implemented by modifying a disposition structure of a vibration module. Thus, in the description below, only a vibration module and elements relevant thereto will be described, and descriptions of other elements are omitted.

With reference to FIG. 10, along with FIG. 3, in a computing apparatus according to an embodiment, except for that a first vibration element 310 and a second vibration element 330 of a vibration module 300 may be attached to a rear surface of a vibration plate 200 by an element adhesive member 350 to face a bottom structure 911 of a system rear cover 910, each of the first vibration element 310 and the second vibration element 330 is substantially similar to the first vibration element 310 in the examples of FIGS. 3 to 8.

In one example, because the vibration module 300 may be attached to the rear surface of the vibration plate 200, a height (or a thickness) of a plate fixing member 250 for avoiding or preventing a direct physical contact between the vibration module 300 and a display module 100 may be reduced. Thus, the cost of the plate fixing member 250 may be reduced. Also, for example, only an air gap AG may be provided between the display module 100 and the vibration plate 200. Thus, a vibration of the vibration plate 200 may be transferred to the display module 100 without being attenuated, thereby increasing a sound pressure level.

Figure 11:
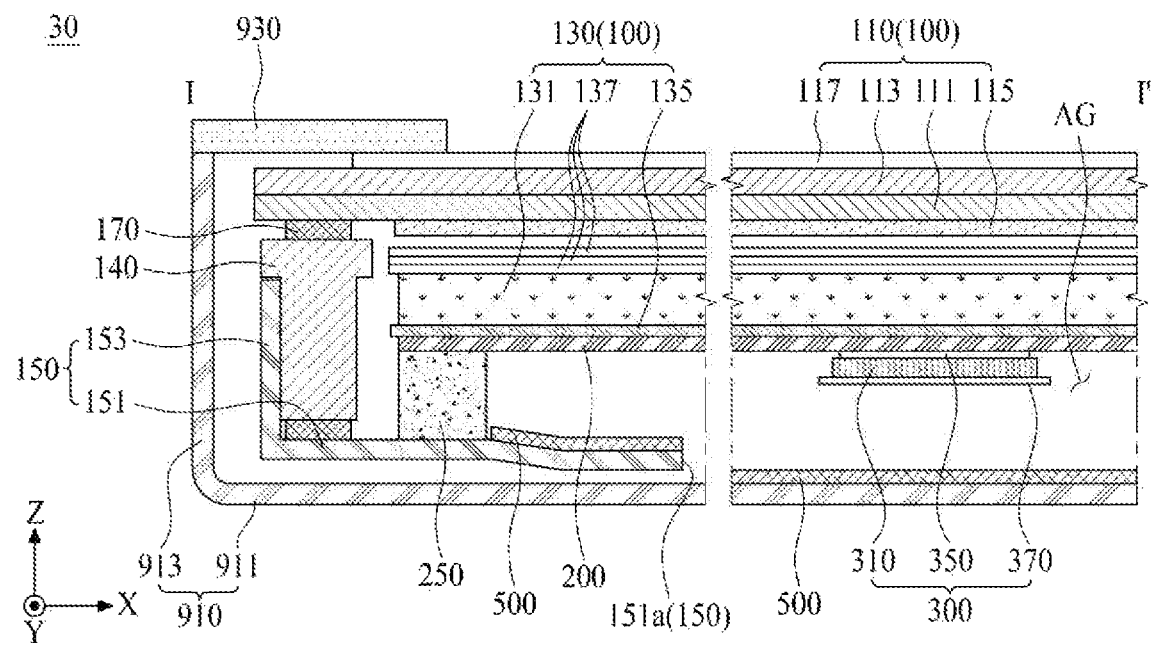

FIG. 11 is another cross-sectional view taken along line I-I' of FIG. 3, and illustrates an embodiment that may be implemented by modifying a disposition structure of a vibration plate. Thus, in description below, only a vibration plate, a vibration module, and elements relevant thereto will be described, and descriptions of other elements are omitted.

With reference to FIG. 11, along with FIG. 3, in a computing apparatus according to an embodiment, a vibration plate 200 may be connected to a display module 100, and may be attached to a rear surface of a reflective sheet 135 configuring a backlight unit 130. The vibration plate 200 may have substantially the same size as that of a light guide plate 131 of the backlight unit 130. The vibration plate 200 may be attached to a cover plate 151 of a supporting cover 150 by a plate fixing member 250. Thus, the vibrating plate 200 may overlap the entire rear surface of the display module 100, except for the periphery of the rear surface of the display module 100.

In a computing apparatus according to an embodiment, except for that a first vibration element 310 and a second vibration element 330 may be attached to a rear surface of the vibration plate 200 by an element adhesive member 350 to face a bottom structure 911 of a system rear cover 910, each of the first vibration element 310 and the second vibration element 330 is substantially similar to the first vibration element 310 in the examples of FIGS. 3 to 8.

A cushion pad 370 may be included in the vibration module 300 or may be provided on the vibration module 300. For example, the cushion pad 370 may be attached to each of the first vibration element 310 and the second vibration element 330. The cushion pad 370 may be attached to a rear surface of each of the first vibration element 310 and the second vibration element 330 facing the bottom structure 911 of the system rear cover 910. The cushion pad 370 according to an embodiment may include a foam pad. The cushion pad 370 may avoid or prevent a direct physical contact between the vibration module 300 and the system rear cover 910, thereby avoiding or preventing the vibration module 300 from being damaged or broken by the physical contact between the vibration module 300 and the system rear cover 910.

A display apparatus according to an embodiment may further include a sound absorbing member 500. The sound absorbing member 500 may be on a rear surface of the vibration plate 200 and a rear surface of the vibration module 300 attached to the vibration plate 200. That is, except for that the sound absorbing member 500 is on the bottom structure 911 of the system rear cover 910 and the cover plate 151 of the supporting cover 150 overlapping the vibration plate 200, the sound absorbing member 500 may be as described above. Thus, its detailed description thereof is omitted.

Additionally, the cover plate 151 of the supporting cover 150 may be provided in a plate shape without an opening 151*a*, and may support the sound absorbing member 500. For example, a sealed air gap AG may be provided between the cover plate 151 of the supporting cover 150 and the vibration plate 200, thereby increasing a sound pressure level generated when the vibration plate 200 vibrates.

The computing apparatus according to an embodiment may obtain a similar effect as that of the computing apparatus illustrated in the examples of FIGS. 3 to 8, and vibration occurring in the vibration plate 200 having a large area may be directly transferred to the display module 100 to vibrate the display panel 110, thereby further enhancing the sound quality or sound pressure level of sound SW generated based on the vibration of the display panel 110. For example, the display panel 110 may vibrate based on a vibration of the vibration plate 200 including, e.g., one or more of: a Mg alloy material, a Mg—Li alloy material, and an Al alloy material, which may have high non-rigidity and high vibration damping ability. Accordingly, a sound having a low-pitched sound band may be output, and sound pressure level may increase in a middle-high-pitched sound band to largely enhance a sound output characteristic in the middle-high-pitched sound band, thereby outputting a full sound in all sound bands. For example, when the vibration module 300 directly vibrates the reflective sheet 135 without using the vibration plate 200, the reflective sheet 135 may have non-rigidity and vibration damping ability, which may be relatively lower than those of the vibration plate 200, causing the reduction in sound characteristic in the middle-high-pitched sound band.

Figure 12:
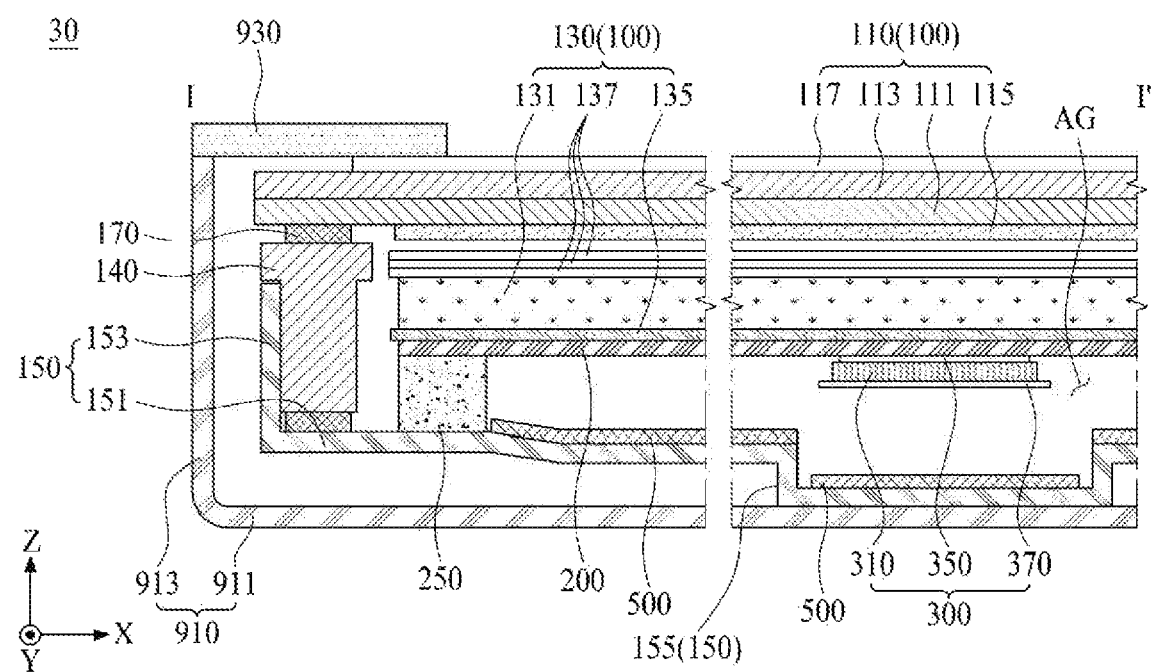

FIG. 12 is another cross-sectional view taken along line I-I' of FIG. 3, and illustrates an embodiment that may be implemented by modifying a structure of a supporting cover. Thus, in description below, only a supporting cover and elements relevant thereto will be described, and descriptions of other elements are omitted.

With reference to FIG. 12, along with FIG. 3, a supporting cover 150 according to an embodiment may include a cover plate 151 having a plate shape, a cover sidewall 153 in a periphery of the cover plate 151, and a concave portion 155 concavely formed from the cover plate 151 and overlapping a vibration module 300.

The cover plate 151 may be provided in a plate shape without an opening 151a, and may cover a rear surface of a vibration plate 200. The cover sidewall 153 may be vertically provided from a periphery of a front surface of the cover plate 151, and may surround an outer surface of a panel guide 140.

The concave portion 155 may be concavely formed from the cover plate 151 overlapping a vibration module 300. The concave portion 155 may be concavely formed from the cover plate 151, for avoiding or preventing a direct contact between the vibration module 300 and the cover plate 151 when the vibration module 300 vibrates. Accordingly, each of a first vibration element 310 and a second vibration element of the vibration module 300 may be inserted into the concave portion 155 when vibrating. The above-described sound absorbing member 500 may be disposed on a top surface (or a bottom) of the concave portion 155

In the supporting cover 150, a portion of the cover plate 151, other than the concave portion 155, may be disposed close to the vibration plate 200 by a depth of the concave portion 155. Accordingly, a distance between the cover plate 151 and the vibration plate 200, except for the concave portion 155, may be reduced, thereby increasing a sound pressure level, which may be applied to the display module 100 according to a vibration of the vibration plate 200.

Therefore, the computing apparatus according to an embodiment may obtain a similar effect as that of the computing apparatus illustrated in FIG. 11, the distance between the cover plate 151 and the vibration plate 200, except for the concave portion 155 may be reduced, thereby further enhancing the sound quality or sound pressure level of the sound.

Figure 13:
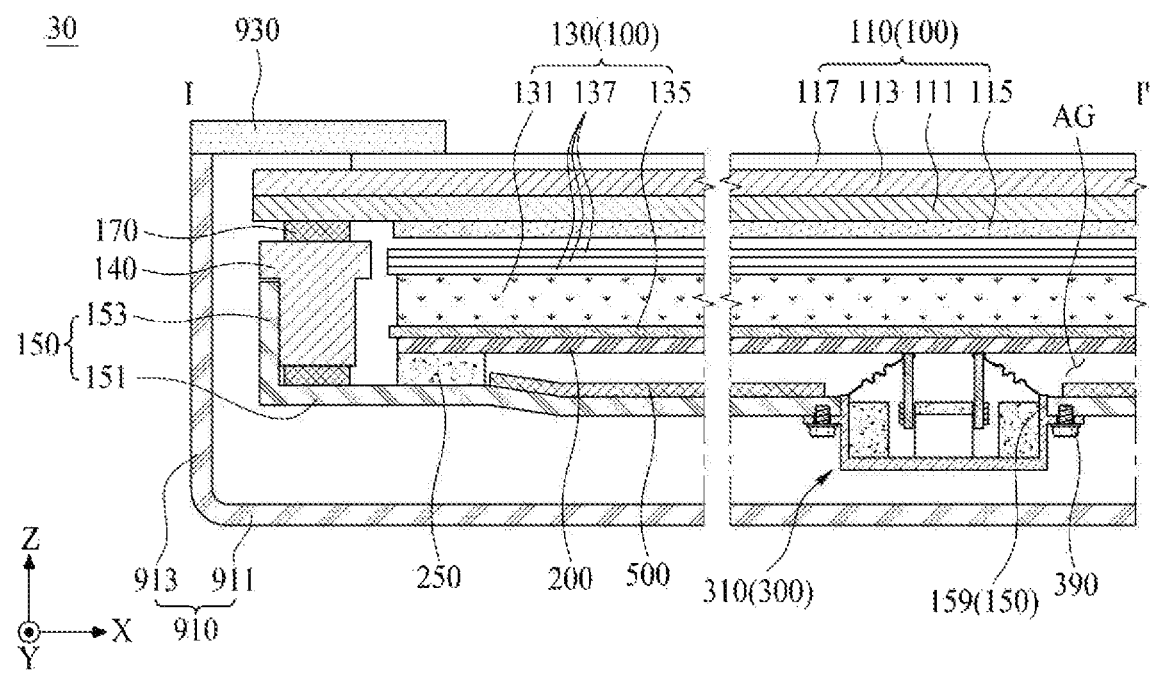
Figure 14:
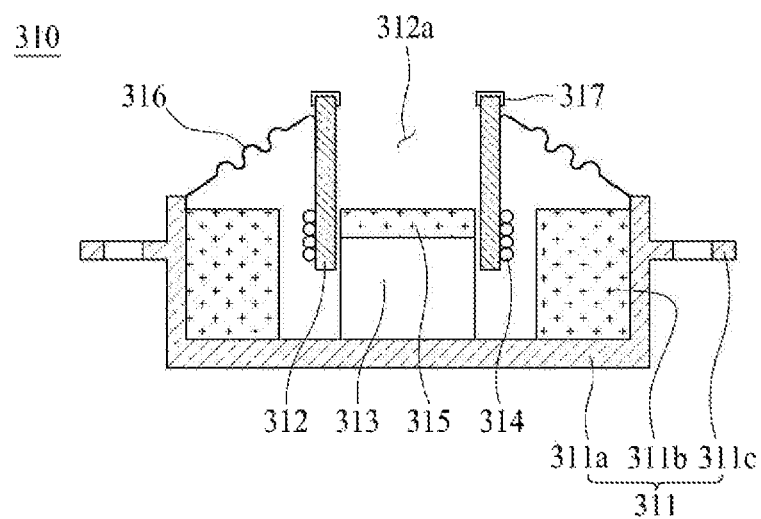
FIG. 14 is a cross-sectional view illustrating an example of the vibration element shown in FIG. 13.

FIG. 14 is a cross-sectional view illustrating an example of the vibration element shown in FIG. 13.

FIG. 13 is another cross-sectional view taken along line I-I' of FIG. 3. FIGS. 13 and 14 illustrate an embodiment that may be configured by modifying a structure of the supporting cover and a structure of the vibration module illustrated in FIG. 11 or 12. Thus, in the description below, only a supporting cover, a vibration module, and elements relevant thereto will be described, and descriptions of other elements are omitted.

With reference to FIG. 13, a supporting cover 150 according to an embodiment may include a cover plate 151 having a plate shape, a cover sidewall 153 provided in a periphery of the cover plate 151, and a first module insertion hole 159 and a second module insertion hole provided in the cover plate 151 overlapping a vibration module 300.

The cover plate 151 may have a plate shape, and may cover a rear surface of a vibration plate 200. The cover sidewall 153 may be vertically provided from a periphery of a front surface of the cover plate 151, and may surround an outer surface of a panel guide 140. Each of the first module insertion hole 159 and the second module insertion hole may be provided in a portion of the cover plate 151 overlapping the vibration module 300, and may expose some portion of the vibration plate 200.

The vibration module 300 may include a first vibration element 310, which may be connected to the vibration plate 200 through the first module insertion hole 159 of the supporting cover 150; and a second vibration element 330 connected to the vibration plate 200 through the second module insertion hole (located in a corresponding location near the second vibration element 330) of the supporting cover 150. Each of the first vibration element 310 and the second vibration element 330 may include an actuator, which may include a magnet member, a bobbin, and a voice coil. The actuator may vibrate the bobbin according to an external magnetic field based on the magnet member and an application magnetic field based on a current which flows in the voice coil according to a sound driving signal applied based on Fleming's left-hand law, thereby vibrating the vibration plate 200.

With reference to FIG. 14, the first vibration element 310 and the second vibration element 330 according to an embodiment may each include a module frame 311, a bobbin 312, a magnet member 313, a coil 314, a center pole 315, and a damper 316. Although the first vibration element 310 is illustrated in FIG. 14, the second vibration element 330 may have a substantially similar structure.

The module frame 311 may be supported by a rear surface of the supporting cover 150. The module frame 311 may include a frame body 311a, an upper plate 311b, and a fixing bracket 311c.

The frame body 311a may overlap the module insertion hole (e.g., the first module insertion hole 159 or the second module insertion hole) in the supporting cover 150. The frame body 311a may act as a lower plate, which may support the magnet member 313. A portion of an upper side of the frame body 311a may be inserted into the module insertion hole 159.

The upper plate 311b may protrude to a periphery of a front surface of the frame body 311a, e.g., to have a cylindrical shape including a hollow portion. Therefore, the frame body 311a and the upper plate 311b may be provided as one body having a U-shape. The frame body 311a and the upper plate 311b are not limited to these terms, and may be expressed by using another term, such as a yoke.

The fixing bracket 311c may protrude from each of one side surface and the other side surface, which may be parallel to each other, of the frame body 311a. The fixing bracket 311c may be fixed to the cover plate 151 of the supporting cover 150 by the module fixing member 390. Thus, each of the first vibration element 310 and the second vibration element may be fixed to the cover plate 151 of the supporting cover 150. For example, the module fixing member 390 may be a screw or a bolt, which may pass through the fixing bracket 311c, and may be fastened to the cover plate 151. Alternatively, the module frame 311 may be supported to the bottom structure 911 of the system rear cover 910, e.g., by using an adhesive member, such as a double-sided tape or the like.

The bobbin 312 may vibrate the vibration plate 200. The bobbin 312 may have, e.g., a cylindrical shape including a hollow portion 312a, and may be connected to a rear surface of the vibration plate 200. The bobbin 312 may be implemented as a ring-shaped (or cylindrical) structure, which may be formed of a material, e.g., produced by processing pulp or paper; Al or Mg or an alloy thereof; synthetic resin, such as polypropylene; or polyamide-based fiber. Embodiments are not limited to these examples. The bobbin 312 may vibrate (for example, may perform a vertical reciprocating motion) based on a magnetic force.

A bobbin ring 317 may be connected to an upper portion of the bobbin 312. The bobbin ring 317 may be connected to the rear surface of the vibration plate 200 by a double-sided adhesive member.

The magnet member 313 may be provided on the module frame 311 to be accommodated into the hollow portion 312a of the bobbin 312. The magnet member 313 may be a permanent magnet having a cylindrical shape to be accommodated into the hollow portion 312a of the bobbin 312. The magnet member 313 may be implemented, e.g., with a sintered magnet, such as barium ferrite, and a material of the magnet member 313 may include one or more of: ferric oxide ($Fe_2O_3$); barium carbonate (or witherite) ($BaCO_3$); neodymium (Nd); strontium ferrite ($Fe_{12}O_{19}Sr$), e.g., with an improved magnet component; and an alloy cast magnet including aluminum (Al), nickel (Ni), cobalt (Co), and/or the like. As another example, the neodymium magnet may be neodymium-iron-boron (Nd—Fe—B). However, embodiments are not limited to these examples.

The coil 314 may be wound to surround a lower outer circumference surface of the bobbin 312 and may be supplied with a voice current from the outside. The coil 314 may be raised and lowered along with the bobbin 312. For example, the coil 314 may be referred to as a "voice coil." When a current is applied to the coil 314, a whole portion of the bobbin 312 may vibrate, for example, may perform a vertical reciprocating motion according to Fleming's left-hand law based on an application magnetic field generated around the coil 314 and an external magnetic field generated around the magnet member 313

The center pole 315 may be installed on the magnet member 313, and may guide a vibration of the bobbin 312. That is, the center pole 315 may be inserted into the hollow portion 312a of the bobbin 312 having a cylindrical shape, and may be surrounded by the bobbin 312. For example, the center pole 315 may be referred to as an "elevation guider" or as "pole pieces."

The damper 316 may be installed between the module frame 311 and the bobbin 312. That is, the damper 316 may be installed between the frame body 311a and an upper outer circumference surface of the bobbin 312. The damper 316 may be referred to as a "spider," a "suspension," or an "edge." The damper 316 may be provided in a structure that may be creased between one end and the other end thereof, and may be contracted and relaxed based on a vibration of the bobbin 312 to control the vibration of the bobbin 312. That is, the damper 316 may be connected between the bobbin 312 and the module frame 311, and may limit a vibration distance of the bobbin 312 by using a restoring force of the damper 316. For example, when the bobbin 312 moves by a certain distance or more or vibrates by a certain distance or less, the bobbin 312 may be restored to an original position with the restoring force of the damper 316.

The first vibration element 310 and the second vibration element 330 according to an embodiment may each be implemented as an internal magnetic type such that the magnet member 313 may be inserted into the hollow portion 312a of the bobbin 312.

Alternatively, each of the first vibration element 310 and the second vibration element 330 according to an embodiment may be implemented as an external magnetic type (or a dynamic type) such that the magnet member 313 is disposed to surround an outer side of the bobbin 312. For example, except for that the magnet member 313 may be provided between the frame body 311a and the upper plate 311b, and the center pole 315 may be provided on the frame body 311a to be inserted into the hollow portion 312a of the bobbin 312, each of the external magnetic type of first vibration element 310 and second vibration element 330 may be substantially similar to the internal magnetic type. Thus, a detailed description is omitted.

In one example, a vibration of the vibration plate 200 caused by a vibration of the vibration module 300 including the actuator may be directly transferred to the display module 100 to vibrate the display panel 110. Thus, a similar effect as that of the computing apparatus illustrated in FIG. 11 may be obtained. Also, in one example, the vibration plate 200 connected to the vibration module 300 including the actuator may have a heat dissipation characteristic similar to aluminum (Al). Thus, the vibration plate 200 may act as a heat sink that may dissipate heat occurring when the actuator operates. Accordingly, an image quality defect may be reduced or prevented from being caused by a rapid temperature difference in a local region of the display module 100 overlapping the actuator.

Figure 15:
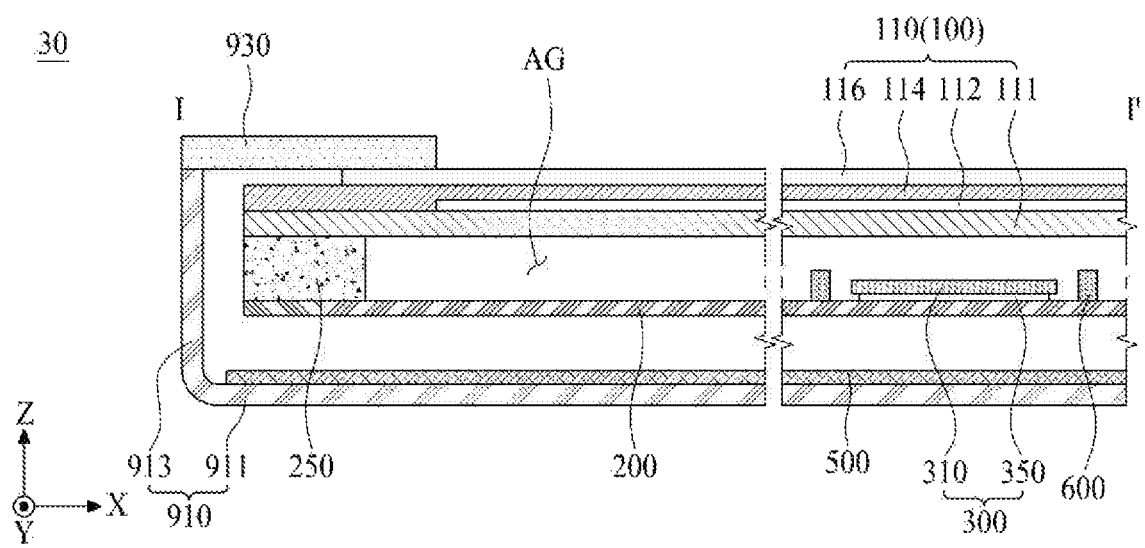
FIGS. 15 to 17 are cross-sectional views taken along line I-I' of FIG. 3, illustrating various examples.
Figure 16:
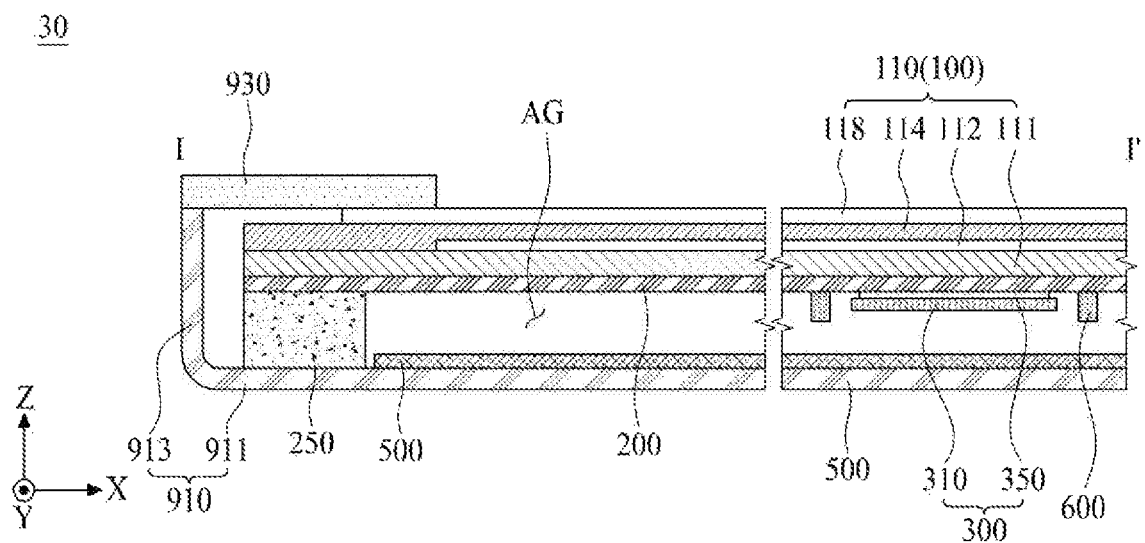
Figure 17:
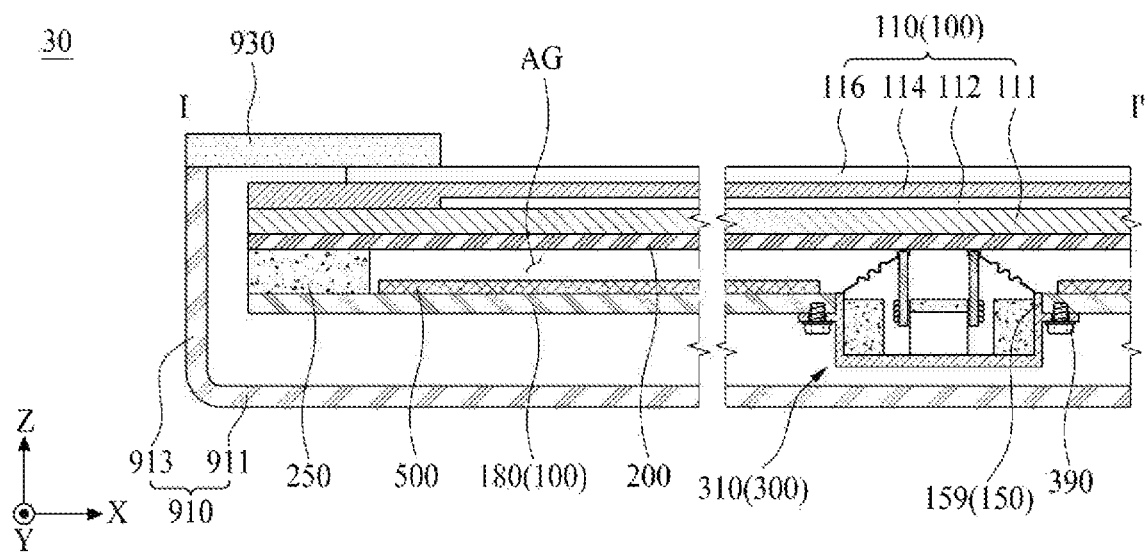

FIGS. 15 to 17 are cross-sectional views taken along line of FIG. 3, illustrating various examples.

FIG. 15 is another cross-sectional view taken along line of FIG. 3, and illustrates an example that may be implemented by modifying a configuration of the display apparatus of the FIG. 4 example. In the description below, only modified elements will be described in detail, other elements are referred to by the reference numerals of the examples of FIGS. 3 to 8, and their repetitive descriptions are omitted or will be briefly made.

With reference to FIG. 15, along with FIGS. 3 and 4, in a computing apparatus according to an embodiment, a display apparatus 30 may include a display module 100, a vibration plate 200, a vibration module 300, a system rear cover 910, and a system front cover 930. The display module 100 may be accommodated into the system rear cover 910, and may display an image. The display module 100 may include a display panel 110, which may display an image, and a panel driving circuit unit (e.g., the panel driving circuit unit 120 of FIG. 5) that may drive the display panel 110. The display panel 110 may be a light-emitting display panel. The display panel 110 may include a pixel array substrate 111 including a pixel array 112 including a plurality of pixels, an encapsulation layer 114 that may encapsulate the pixel array 112, and an optical film 116 attached to a top of the encapsulation layer 114.

The plurality of pixels may be respectively provided in a plurality of pixel areas defined by a plurality of pixel driving lines. Further, each of the plurality of pixels may include a pixel circuit, including at least two thin film transistors (TFTs) and at least one capacitor, and a light-emitting device that may emit light with a current supplied from the pixel circuit. For example, the light-emitting device may include an organic light-emitting layer or a quantum dot light-emitting layer. As another example, the light-emitting device may include a micro light-emitting diode (micro-LED).

The encapsulation layer 114 may protect the TFTs and the light-emitting device from an external impact, and may reduce or prevent water or moisture from penetrating into the light-emitting device. The optical film 116 may be attached to a top surface of the encapsulation layer 114, e.g., by a transparent adhesive member. The optical film 116 may be a polarization film that may circularly polarize external light reflected by the TFT and/or the pixel driving lines provided on the pixel array substrate 111, thereby enhancing the visibility and contrast ratio of the display panel 110.

Additionally, the display panel 110 may further include a barrier layer and a touch electrode layer disposed between the encapsulation layer 114 and the optical film 116. And, the display panel 110 may further include a color filter layer on a top surface of the encapsulation layer 114. The encapsulation layer 114 may be replaced with an encapsulation substrate that may be attached to the pixel array substrate 111 by a filler surrounding the pixel array 112. If the filler is a transparent filler, the encapsulation substrate may be a transparent encapsulation substrate.

The panel driving circuit unit may be connected to a pad part in the display panel 110, and may display an image, corresponding to video data supplied from the system body 10, on each pixel. The panel driving circuit unit 120, as illustrated in the FIG. 5 example, may include the plurality of data flexible circuit films 121, the plurality of data driving ICs 123, the PCB 125, and the timing control circuit 127. Thus, its detailed description is omitted.

The vibration plate 200 may cover a rear surface of the display module 100. That is, a periphery of the vibration plate 200 may be connected to the rear surface of the display panel 110 by a plate fixing member 250. For example, the vibrating plate 200 may overlap the entire rear surface of the display module 100. The vibration plate 200, as described above, may include a Mg alloy material, a Mg—Li alloy material, an Al alloy material, and/or the like.

The vibration module 300 may be attached to a front surface of the vibration plate 200 by an element adhesive member 350. Alternatively, as illustrated in the FIG. 10 example, the vibration module 300 may be attached to a rear surface of the vibration plate 200 by the element adhesive member 350. The vibration module 300 may include the above-described first vibration element 310 and second vibration element 330, and are as described above. Thus, a detailed description is omitted. A buffer member 600, as described above, may be disposed near the vibration module 300.

The system rear cover 910 may accommodate the display module 100 and the vibration plate 200 connected to the display module 100. The system rear cover 910, as described above, may include a bottom structure 911 that may cover a rear surface of the vibration plate 200; and a sidewall structure 913 that may be in a periphery of the bottom structure 911, and may cover side surfaces of the display module 100 and side surfaces of the vibration plate 200.

A sound absorbing member 500 described above may be disposed on a front surface of the bottom structure 911, and may cover the rear surface of the vibration plate 200. The system front cover 930 may cover a periphery of a front surface of the display panel 110, and may conceal a non-display area of the display panel 110 and the panel driving circuit unit 120. A similar effect as that of the computing apparatus illustrated in the examples of FIGS. 3 to 8 may be obtained.

FIG. 16 is another cross-sectional view taken along line I-I' of FIG. 3, and illustrates an embodiment that may be implemented by modifying a disposition structure of a vibration plate in the display apparatus illustrated in FIG. 15. Thus, in the description below, only a disposition structure of a vibration plate and elements relevant thereto will be described, other elements are referred to by reference numerals of the examples of FIGS. 3 to 8, and repetitive descriptions are omitted or will be briefly made.

With reference to FIG. 16, along with FIGS. 3 and 15, in a computing apparatus according to an embodiment, a vibration plate 200 may be attached to a display panel 110 of a display module 100. The vibration plate 200 may have substantially the same size as that of an array substrate 111 of the display panel 110. The vibration plate 200 may be attached to the bottom structure 911 of the system rear cover 910 by a plate fixing member 250. Therefore, a sealed air gap AG may be provided between the bottom structure 911 of the system rear cover 910 and the vibration plate 200, thereby increasing a sound pressure level generated when the vibration plate 200 vibrates.

In one example, except for that a first vibration element 310 and a second vibration element 330 of a vibration module 300 may be attached to a rear surface of the vibration plate 200, e.g., by an element adhesive member 350 to face the bottom structure 911 of the system rear cover 910, each of the first vibration element 310 and the second vibration element is substantially similar to the first vibration element illustrated in the examples of FIGS. 3 to 8.

The computing apparatus according to an embodiment may obtain a similar effect as that of the computing apparatus illustrated in the examples of FIGS. 3 to 8, and vibration occurring in the vibration plate 200 having a large area may be directly transferred to the display module 100 to vibrate the display panel 110, thereby further enhancing the sound quality or sound pressure level of sound SW generated based on the vibration of the display panel 110. For example, the display panel 110 may vibrate based on a vibration of the vibration plate 200 including, e.g., one or more of: a Mg alloy material, a Mg—Li alloy material, and an Al alloy material, which may have high non-rigidity and high vibration damping ability. Accordingly, a sound having a low-pitched sound band may be output, and sound pressure level may increase in a middle-high-pitched sound band to largely enhance a sound output characteristic in the middle-high-pitched sound band, thereby outputting a full sound in all sound bands. For example, when the vibration module 300 directly vibrates the display panel 110 without using the vibration plate 200, the array substrate 111 of the display panel 110 may have non-rigidity and vibration damping ability that may be relatively lower than those of the vibration plate 200, causing the reduction in sound characteristic in the middle-high-pitched sound band.

FIG. 17 is another cross-sectional view taken along line I-I' of FIG. 3, and illustrates an example in which the display module of the display apparatus of the FIG. 13 example is replaced with the display module of the FIG. 16 example.

With reference to FIG. 17, along with FIGS. 3 and 14, in a computing apparatus according to an embodiment, a display apparatus 30 may include a display module 100, a vibration plate 200, a vibration module 300, a system rear cover 910, and a system front cover 930. The display module 100 may be accommodated into the system rear cover 910, and may display an image. The display module 100 may include a display panel 110 that may display an image, a panel driving circuit unit that may drive the display panel 110, and a supporting cover 180 that may support the display panel 110 and the vibration module 300.

The display panel 110 may be a light-emitting display panel, and may have a substantially similar configuration as that of the display panel illustrated in FIG. 15. Thus, a detailed description is omitted.

The panel driving circuit unit may be connected to a pad part in the display panel 110, and may display an image, corresponding to video data supplied from the system body 10, on each pixel. The panel driving circuit unit 120, as illustrated in the FIG. 5 example, may include the plurality of data flexible circuit films 121, the plurality of data driving ICs 123, the PCB 125, and the timing control circuit 127. Thus, a detailed description is omitted.

The vibration plate 200 may be attached to the display panel 110 of the display module 100, and may be embedded into the display module 100. The vibration plate 200 may have substantially the same size as that of an array substrate 111 of the display panel 110. The vibration plate 200 may be attached to a periphery of a front surface of a supporting cover 180, e.g., by a plate fixing member 250.

The supporting cover 180 may be provided in a plate shape, and may cover a rear surface of the display panel 110. The supporting cover 180 may include a first module insertion hole 159 and a second module insertion hole provided in a cover plate 151 overlapping a vibration module 300. Each of the first module insertion hole 159 and the second module insertion hole may be provided in the supporting cover 180 overlapping the vibration module 300 and may expose a portion of the vibration plate 200. A sound absorbing member 500 described above may be disposed on a front surface of the supporting cover 180, and may cover a rear surface of the vibration plate 200.

The vibration module 300 may include a first vibration element 310 and a second vibration element 330. Each of the first vibration element 310 and the second vibration element 330 may include a module frame 311, a bobbin 312, a magnet member 313, a coil 314, a center pole 315, and a damper 316 and may have a substantially similar configuration as the first vibration element illustrated in the FIG. 14 example. Thus, a detailed description is omitted.

The system rear cover 910 may accommodate the display module 100 with the vibration plate 200 embedded therein and the vibration module 300 connected to the vibration plate 200 and connected to the display module 100. The system rear cover 910 may include a bottom structure 911, which may cover a rear surface of the display module 100 and a rear surface of the vibration module 300, and a sidewall structure 913, which may be provided in a periphery of the bottom structure 911, and may cover side surfaces of the display module 100 and side surfaces of the vibration plate 200. The system front cover 930 may cover a periphery of a front surface of the display panel 110, and may conceal a non-display area of the display panel 110 and a panel driving circuit unit 120.

A vibration of the vibration plate 200 caused by a vibration of the vibration module 300 including the actuator may be directly transferred to the display module 100 to vibrate the display panel 110. Thus, a similar effect as that of the computing apparatus illustrated in the FIG. 16 example may be obtained. Also, the vibration plate 200 connected to the vibration module 300 may have a heat dissipation characteristic similar to aluminum (Al). Thus, the vibration plate 200 may act as a heat sink that may dissipate heat occurring when the actuator operates. Accordingly, an image quality defect of the display panel 110 may be reduced or prevented from being caused by a rapid temperature difference in a local region of the display module 100 overlapping the vibration module 300. Moreover, the emission efficiency and luminance of the display panel 110 may be enhanced.

Therefore, the computing apparatus according to an embodiment may output the sound SW, generated based on the vibration of the display panel 110, to a region in front of the display panel 110, instead of a region behind and/or under the display panel 110. Thus, a sound field that fully fills a whole screen may be realized, whereby a viewer's immersion experience may be enhanced due to harmony (or match) between an image and a sound. For example, in the computing apparatus according to an embodiment, the display panel 110 may vibrate based on a vibration of the large-area vibration plate 200 including, e.g., one or more of: a Mg alloy material, a Mg—Li alloy material, or an Al alloy material, thereby outputting a sound having high sound quality and a broad sound band.

Figure 18:
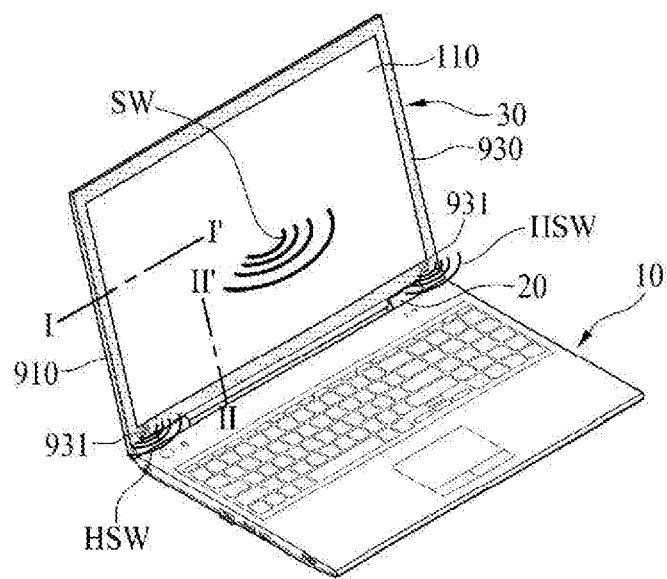
FIG. 18 is a diagram illustrating a computing apparatus according to an embodiment of the present disclosure.
Figure 19:
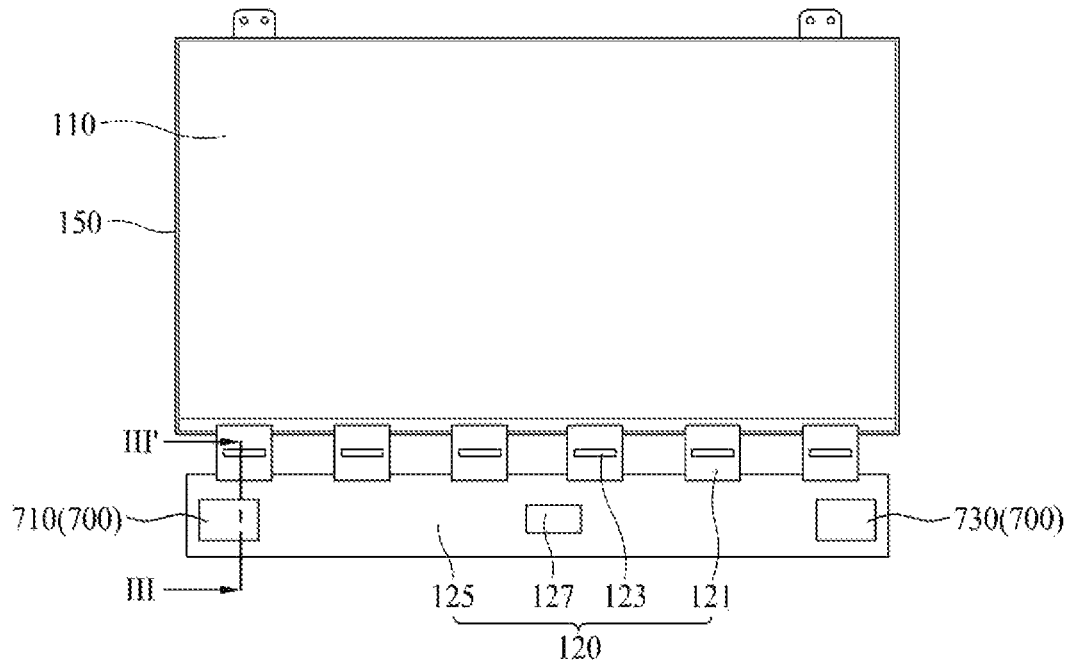
FIG. 19 is a plan view illustrating the display module of FIG. 18.
Figure 20:
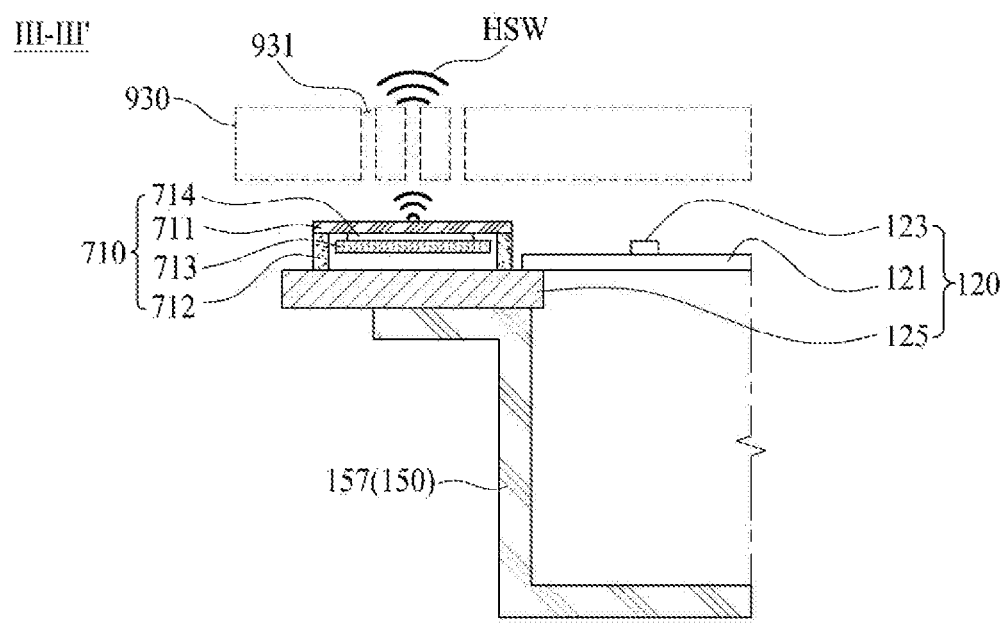
FIG. 20 is a cross-sectional view taken along line of FIG. 19.
Figure 21:
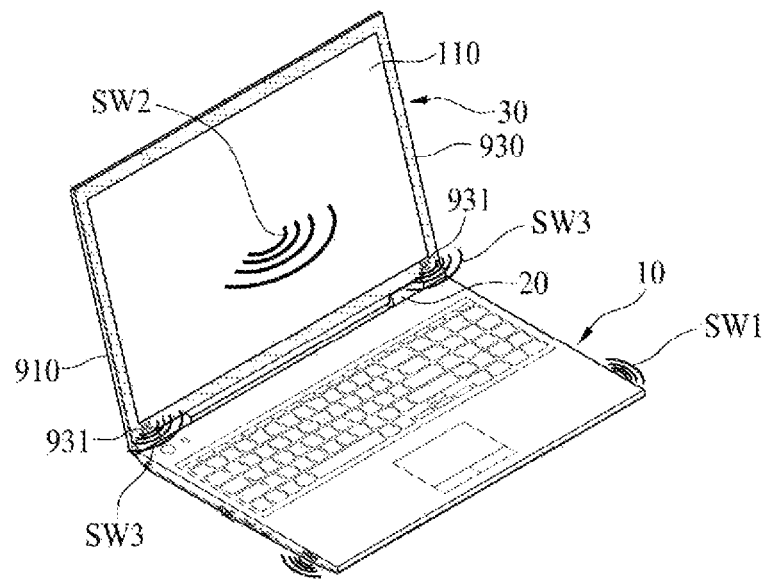
FIG. 21 is a perspective view illustrating a computing apparatus according to an embodiment of the present disclosure.

FIG. 18 is a diagram illustrating a computing apparatus according to an embodiment of the present disclosure. FIG. 19 is a plan view illustrating the display module of FIG. 18. FIG. 20 is a cross-sectional view taken along line of FIG. 19. FIG. 21 is a perspective view illustrating a computing apparatus according to an embodiment of the present disclosure.

The drawings illustrate an example in which a twitter module is provided on a PCB of a panel driving circuit unit. Thus, in the description below, a twitter module and elements relevant thereto will be described, other elements are referred to by like reference numerals, and repetitive descriptions are omitted or will be briefly made. A cross-sectional view taken along line I-I' of FIG. 18 is illustrated in one of FIGS. 4, 10 to 13, and 15 to 17, and a cross-sectional view taken along line II-II' illustrated in FIG. 18 is illustrated in FIG. 5.

With reference to FIGS. 18 to 20, a display apparatus 30 of a computing apparatus according to an embodiment may include a display module 100, a vibration plate 200, a vibration module 300, a twitter module 700, a system rear cover 910, and a system front cover 930. The display module 100 may include a display panel 110, a panel driving circuit unit 120, a backlight unit, a panel guide, and a supporting cover 150. Except for a disposition structure of the panel driving circuit unit 120, the other elements are substantially similar to those of the display apparatus illustrated in the examples of FIGS. 3 to 17, and thus, are referred to by like reference numerals, and their detailed descriptions are omitted.

A PCB 125 of the panel driving circuit unit 120 may be disposed on one side of the supporting cover 150 to face the system front cover 930. That is, the PCB 125 may be disposed in a planar state on a side surface of the supporting cover 150, without being disposed on a rear surface of the supporting cover 150. The PCB 125 may be supported in a planar state by a supporting bracket 157 which may be doubly bent from a cover plate 151 of the supporting cover 150 adjacent to a system body 10. The vibration plate 200 and the vibration module 300 may be substantially similar to those of the display apparatus illustrated in the examples of FIGS. 3 to 17, and thus are referred to by like reference numerals, and their detailed descriptions are omitted.

The twitter module 700 may be on the PCB 125 of the panel driving circuit unit 120, and may output sound having a high-pitched sound band in response to a sound driving signal input thereto. The twitter module 700 may include a first twitter 710, disposed on one periphery of the PCB 125, and a second twitter 730 on the other periphery of the PCB 125. The first twitter 710 may include a metal plate 711 on the one periphery of the PCB 125, a plate supporting member 712 supporting the metal plate 711, and a piezoelectric element 713 attached to a rear surface of the metal plate 711 to face a front surface of the PCB 125.

The metal plate 711 may be formed of, e.g., one or more of: a Mg alloy material, a Mg—Li alloy material, an Al alloy material, and the like. The metal plate 711 may vibrate based on a vibration of the piezoelectric element 713 to output sound having a high-pitched sound band of 4 kHz or more. Accordingly, the metal plate 711 may have a thickness of 0.1 mm to 0.5 mm. The Mg alloy material, the Mg—Li alloy material, or the Al alloy material of the metal plate 711 may be a lightest material of metal materials of a mechanical structure, and may have high non-rigidity and relatively high vibration damping ability. Thus, the metal plate 711 may be suitable for outputting a sound having a high-pitched sound band.

The piezoelectric element 713 may be attached to a rear surface of the metal plate 711 by an adhesive 714, and may be spaced apart from a front surface of the PCB 125 by a particular distance. The piezoelectric element 713 may vibrate according to the sound driving signal, for example, a left sound driving signal, input thereto to vibrate the metal plate 711. The piezoelectric element 713 may include a piezoelectric material layer having a piezoelectric effect, a first electrode disposed on a front surface of the piezoelectric material layer, and a second electrode disposed on a rear surface of the piezoelectric material layer. The piezoelectric element 713 has a substantially similar configuration as that of the above-described vibration element. Thus, a detailed description is omitted. The plate supporting member 712 may be disposed between a periphery of the metal plate 711 and the front surface of the PCB 125 to support the metal plate 711, thereby preventing a physical contact between the piezoelectric element 713 and the PCB 125 when the metal plate 711 vibrates. In the first twitter 710, the piezoelectric element 713 may vibrate according to the sound driving signal, for example, the left sound driving signal, input thereto to vibrate the metal plate 711, thereby outputting a high sound (or sound wave) HSW having a high-pitched sound band to the system front cover 930.

The second twitter 730 may be on the other periphery of the PCB 125. Substantially similar to the first twitter 710, the second twitter 730 may include a metal plate, a plate supporting member supporting the metal plate, and a piezoelectric element attached to a rear surface of the metal plate to face the front surface of the PCB 125. Thus, a detailed description is omitted. In the second twitter 730, the piezoelectric element may vibrate according to a sound driving signal, for example, a right sound driving signal, input thereto to vibrate the metal plate, thereby outputting a high sound HSW having a high-pitched sound band to the system front cover 930.

The system rear cover 910 may accommodate the display module 100 and the vibration plate 200 connected to the vibration module 300. The system rear cover 910 may include a bottom structure 911 and a sidewall structure 913 and is as described above. Thus, a detailed description is omitted.

The system front cover 930 may cover a periphery of a front surface of the display panel 110. That is, the system front cover 930 may conceal a non-display area of the display panel 110 and the panel driving circuit unit 120. The system front cover 930 may be connected to the sidewall structure 913 of the system rear cover 910 by a fastening member, such as a hook, and may cover a front surface of the display module 100 other than a display area of the display panel 110.

The system front cover 930 may include a plurality of sound output holes 931 that may overlap the twitter module 700 on the PCB 125 of the panel driving circuit unit 120. The plurality of sound output holes 931 may be arranged at particular intervals or constant intervals in a region, overlapping each of the first and second twitter modules 710 and 730, of a front surface of the system front cover 930, and may transmit the high sound HSW having a high-pitched sound band output from each of the first and second twitter modules 710 and 730.

The sound HSW having a high-pitched sound band may be output to a region in front of the display panel 110 through the twitter module 700 disposed on the PCB 125 of the panel driving circuit unit 120, thereby further enhancing sound quality in a high sound band. For example, because the twitter module 700 facing a face of a viewer may output sound toward the ears of the viewer, a sound having a middle-high-pitched sound band of 2 kHz or more having strong directionality may be directly transferred to the viewer. Furthermore, by providing a twitter sound based on a vibration of the twitter module and a main sound based on a vibration of the display panel 110, a sound substantially similar to an original sound may be provided to the viewer, thereby increasing the viewer's immersion experience.

In FIGS. 3 and 18, the computing apparatus according to an embodiment is illustrated as a notebook computer, but embodiments are not limited thereto. For example, the computing apparatus according to an embodiment may be applied to portable information devices having a structure in which a system body is connected to a display apparatus by a hinge part, such as a tablet computer, an electronic organizers, or a personal digital assistant.

And, as illustrated in FIGS. 1 to 17, the computing apparatus according to an embodiment of the present disclosure may output sound by using a vibration of the display panel using the vibration plate and the vibration module, but a sound may be output by using an embedded speaker equipped in the system body and the twitter module illustrated in FIG. 18, without being limited thereto. Furthermore, as illustrated in FIG. 21, the computing apparatus according to the present disclosure may realize a stereoscopic sound by using a first sound output SW1 using the embedded speaker equipped in the system body, a second sound output SW2 based on a vibration of the display panel using the vibration plate and the vibration module, and a third sound output SW3 based on a vibration of the metal plate using the twitter module.

Figure 22:
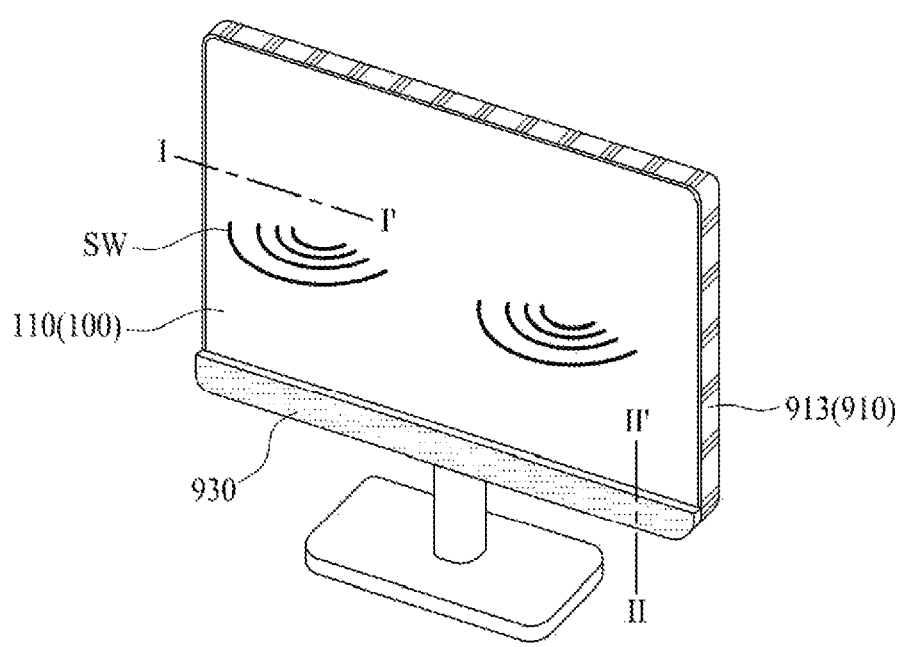
FIG. 22 is a perspective view illustrating a display apparatus according to an embodiment of the present disclosure.

FIG. 22 is a perspective view illustrating a display apparatus according to an embodiment of the present disclosure.

Additionally, in the computing apparatus according to the present disclosure illustrated in FIGS. 1 to 17, the display apparatus 30 may be used as a display apparatus, such as a television (TV) or a monitor as illustrated in FIG. 22, a navigation device, an electronic pad, a tablet computer, and so on. A cross-sectional surface view along line I-I' illustrated in FIG. 22 is illustrated in one of FIGS. 4, 10 to 13, and 15 to 17, and a cross-sectional view taken along line II-II' illustrated in FIG. 22 is illustrated in FIG. 5. The display apparatus according to the present disclosure illustrated in FIG. 22 may output sound to a region in front of the display panel 110, based on a vibration of the display panel 110 using the vibration plate and the vibration module.

Figure 23:
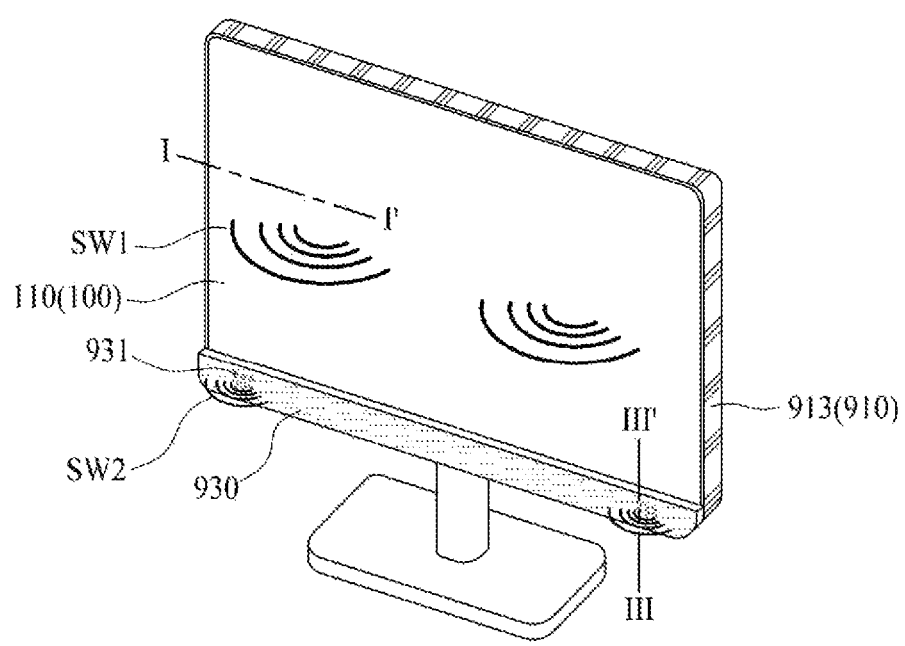
FIG. 23 is a perspective view illustrating a display apparatus according to an embodiment of the present disclosure.

FIG. 23 is a perspective view illustrating a display apparatus according to an embodiment of the present disclosure.

Furthermore, in the computing apparatus according to the present disclosure illustrated in FIGS. 18 to 20, the display apparatus 30 may be used as a display apparatus, such as a TV or a monitor as illustrated in FIG. 23, a navigation device, an electronic pad, a tablet computer, and so on. A cross-sectional view taken along line I-I' of FIG. 23 is illustrated in one of FIGS. 4, 10 to 13, and 15 to 17, and a cross-sectional view taken along line illustrated in FIG. 23 is illustrated in FIG. 20. The display apparatus according to the present disclosure illustrated in FIG. 23 may output sound to a front direction of the display panel 110 by using a first sound SW1 based on a vibration of the display panel using the vibration plate and the vibration module and a second sound SW2 based on a vibration of the metal plate using the twitter module, thereby outputting a high-quality sound.

In the display apparatus and the computing apparatus including the same, according to the embodiments of the present disclosure, because a sound is output to a region in front of the display panel, a sound having high sound quality and a broad sound band may be output, and a sound field that fully fills a whole screen may be realized, whereby a viewer's immersion experience may be enhanced due to harmony (or match) between an image and a sound.

A display apparatus according to an embodiment of the present disclosure will be described below.

According to an embodiment of the present disclosure, a display apparatus may include: a display module including a display panel configured to display an image, a system rear cover covering a rear surface of the display module, a vibration plate between the system rear cover and the rear surface of the display module, and a vibration module configured to vibrate the vibration plate. The display panel may be further configured to vibrate based on a vibration of the vibration plate to output sound.

For example, the display apparatus according to an embodiment of the present disclosure may further include a plate fixing member between the vibration plate and the rear surface of the display module. For example, in the display apparatus according to an embodiment of the present disclosure, the plate fixing member may be configured to reduce the vibration of the vibration plate from being directly transferred to the display module. For example, in the display apparatus according to an embodiment of the present disclosure, an air gap may be provided between the vibration plate and the display module. For example, the display apparatus according to an embodiment of the present disclosure may further include a cover plate between the plate fixing member and the rear surface of the display module, the cover plate being configured to support the vibration plate.

For example, the display apparatus according to an embodiment of the present disclosure may further include a sound absorbing member between the system rear cover and a rear surface of the vibration plate. For example, in the display apparatus according to an embodiment of the present disclosure, the display module may include a panel guide supporting the display panel, and a supporting cover accommodating the panel guide, and the vibration plate may be on a rear surface of the supporting cover. For example, in the display apparatus according to an embodiment of the present disclosure, the supporting cover may include a cover plate configured to support the panel guide, the cover plate covering a periphery of the display panel, the cover plate including an opening over or under a middle portion of the display panel, the vibration plate may be attached to the cover plate by a plate fixing member, the plate fixing member may be between a periphery of the vibration plate and the cover plate, and an air gap may be provided between the vibration plate and the display module.

For example, in the display apparatus according to an embodiment of the present disclosure, the vibration module may be attached to a front surface or a rear surface of the vibration plate. For example, in the display apparatus according to an embodiment of the present disclosure, the display module may include a panel guide configured to support the display panel, a supporting cover accommodating the panel guide, and a backlight unit accommodated in the supporting cover, the vibration plate may be attached to the supporting cover by a plate fixing member, and the vibration plate supports a rear surface of the backlight unit.

For example, in the display apparatus according to an embodiment of the present disclosure, the vibration module may include one or more vibration elements, each including one of a piezoelectric material layer, and an actuator. For example, the display apparatus according to an embodiment of the present disclosure may further include a cushion pad on the vibration module, the cushion pad being configured to protect the vibration module.

For example, the display apparatus according to an embodiment of the present disclosure may further include a cover plate between the system rear cover and the vibration plate, and a plate fixing member configured to connect the cover plate and the vibration plate. For example, in the display apparatus according to an embodiment of the present disclosure, the cover plate covers a rear surface of the vibration plate, and the cover plate may include a concave portion recessed from a portion of the cover plate overlapping the vibration module attached to the vibration plate.

For example, the display apparatus according to an embodiment of the present disclosure may further include a sound absorbing member on the cover plate between the cover plate and the rear surface of the vibration plate, and the concave portion may be between the cover plate and a rear surface of the vibration module. For example, the display apparatus according to an embodiment of the present disclosure may further include a buffer member adjacent to the vibration module, and a height of the buffer member with respect to a front surface of the vibration plate may be greater than a height of the vibration module with respect to the front surface of the vibration plate.

For example, in the display apparatus according to an embodiment of the present disclosure, the vibration plate may be connected to the rear surface of the display module. For example, the display apparatus according to an embodiment of the present disclosure may further include a plate fixing member between the vibration plate and the system rear cover, and the plate fixing member may be configured to connect the cover plate and the system rear cover.

For example, in the display apparatus according to an embodiment of the present disclosure, an air gap may be provided between the vibration plate and the system rear cover. For example, in the display apparatus according to an embodiment of the present disclosure, the vibration plate may include one or more of: a magnesium (Mg) alloy material, a Mg-lithium (Li) alloy material, and an aluminum (Al) alloy material. For example, in the display apparatus according to an embodiment of the present disclosure, the vibration plate may have a thickness of 0.1 mm to 1.0 mm.

For example, the display apparatus according to an embodiment of the present disclosure may further include a twitter module including a plurality of twitters in the display module, the display module may further include a printed circuit board connected to the display panel, and each of the plurality of twitters may include a metal plate on the printed circuit board, and a piezoelectric element attached to the metal plate, the piezoelectric element including a piezoelectric material layer. For example, the display apparatus according to an embodiment of the present disclosure may further include a system front cover covering a non-display area of the display panel and the printed circuit board, and the system front cover may include a plurality of sound output holes overlapping each of the plurality of twitters. For example, in the display apparatus according to an embodiment of the present disclosure, the display module may include a printed circuit board connected to the display panel, a user connector on the printed circuit board, a sound output connector connected to the vibration module, and an audio amplifier on the printed circuit board, the audio amplifier being configured to amplify a sound signal input through the user connector to generate a sound driving signal, and output the generated sound driving signal to the sound output connector.

According to an embodiment of the present disclosure, a display apparatus may include: a computing apparatus, including: a system body, and a display apparatus connected to the system body, the display apparatus including: a display module including a display panel configured to display an image, a system rear cover covering a rear surface of the display module, a vibration plate between the system rear cover and the rear surface of the display module, and a vibration module configured to vibrate the vibration plate, and the display panel may be further configured to vibrate based on a vibration of the vibration plate to output sound. For example, the display apparatus according to an embodiment of the present disclosure may further include a hinge part between the system body and the display apparatus, the hinge part being rotatable and configured to support the display apparatus.

According to an embodiment of the present disclosure, a display apparatus may include: a display module including a display panel configured to display an image, a vibration plate adjacent to a rear surface of the display module, a vibration module configured to vibrate the vibration plate, and a buffer member on the vibration plate and adjacent to the vibration module, the buffer member being configured to protect the vibration module. The display panel may be further configured to vibrate based on a vibration of the vibration plate to output sound.

For example, in the display apparatus according to an embodiment of the present disclosure, the buffer member may be between the vibration plate and a rear surface of the display panel. For example, the display apparatus according to an embodiment of the present disclosure may further include a system rear cover covering a rear surface of the display module, the vibration plate may be between the system rear cover and the display panel, and the buffer member may be between the vibration plate and the system rear cover.

For example, in the display apparatus according to an embodiment of the present disclosure, the vibration plate may include one or more of: a magnesium (Mg) alloy material, a Mg-lithium (Li) alloy material, and an aluminum (Al) alloy material. For example, in the display apparatus according to an embodiment of the present disclosure, the vibration plate may have a thickness of 0.1 mm to 1.0 mm.

For example, in the display apparatus according to an embodiment of the present disclosure, the buffer member may surround the vibration module. For example, in the display apparatus according to an embodiment of the present disclosure, an air gap may be provided between the vibration plate and the system rear cover. For example, in the display apparatus according to an embodiment of the present disclosure, an air gap may be provided between the vibration plate and the display module.

It will be apparent to those skilled in the art that various modifications and variations may be made in the present disclosure without departing from the technical idea or scope of the disclosure. Thus, it may be intended that embodiments of the present disclosure cover the modifications and variations of the disclosure provided they come within the scope of the appended claims and their equivalents.

What is claimed is:

1. A display apparatus, comprising:
a display module comprising a display panel configured to display an image;
a system rear cover covering a rear surface of the display module;
a vibration plate between the system rear cover and the rear surface of the display module;
a vibration module configured to vibrate the vibration plate,
a cover plate between the system rear cover and the vibration plate, the cover plate having a concave portion recessed from a portion of the cover plate overlapping the vibration module attached to the vibration plate;
a sound absorbing member on the cover plate between the cover plate and a rear surface of the vibration plate, the concave portion being between the cover plate and a rear surface of the vibration module; and
a buffer member spaced apart from the vibration module, the buffer member being on the vibration plate adjacent to the vibration module,
wherein a height of the buffer member with respect to the rear surface of the vibration plate is greater than a height of the vibration module with respect to the rear surface of the vibration plate, and
wherein the display panel is further configured to vibrate based on a vibration of the vibration plate to output sound.

2. The display apparatus of claim 1, further comprising a plate fixing member between the vibration plate and the rear surface of the display module.

3. The display apparatus of claim 2, wherein the plate fixing member is configured to reduce the vibration of the vibration plate from being directly transferred to the display module.

4. The display apparatus of claim 2, wherein an air gap is provided between the vibration plate and the display module.

5. The display apparatus of claim 1, wherein the sound absorbing member is further between the rear surface of the vibration module and the concave portion.

6. The display apparatus of claim 1, wherein:
the display module comprises: a panel guide supporting the display panel; and a supporting cover accommodating the panel guide; and the vibration plate is on the rear surface of the display module, and
the supporting cover includes the cover plate.

7. The display apparatus of claim 6, wherein:
the supporting cover comprises the cover plate configured to support the panel guide;
the cover plate covering a periphery of the display panel, the cover plate comprising an opening over or under a middle portion of the display panel;
the vibration plate is attached to the cover plate by a plate fixing member;
the plate fixing member is between a periphery of the vibration plate and the cover plate; and
an air gap is provided between the vibration plate and the cover plate.

8. The display apparatus of claim 1, wherein the vibration module is attached to the rear surface of the vibration plate.

9. The display apparatus of claim 1, wherein: the display module comprises: a panel guide configured to support the display panel;
a supporting cover accommodating the panel guide; and a backlight unit accommodated in the supporting cover;

the vibration plate is attached to the supporting cover by a plate fixing member; the vibration plate supports a rear surface of the backlight unit; and the supporting cover includes the cover plate.

10. The display apparatus of claim 1, wherein the vibration module comprises one or more vibration elements, each comprising one of: a piezoelectric material layer; and an actuator.

11. The display apparatus of claim 1, further comprising a cushion pad on the vibration module, the cushion pad being configured to protect the vibration module.

12. The display apparatus of claim 1, further comprising:
a plate fixing member configured to connect the cover plate and the vibration plate.

13. The display apparatus of claim 1, wherein:
the cover plate covers a rear surface of the vibration plate.

14. The display apparatus of claim 1, wherein the vibration plate is connected to the rear surface of the display module.

15. The display apparatus of claim 1, wherein an air gap is provided between the cover plate and the system rear cover.

16. The display apparatus of claim 1, wherein the vibration plate comprises one or more of: a magnesium (Mg) alloy material, a Mg-lithium (Li) alloy material, and an aluminum (Al) alloy material.

17. The display apparatus of claim 1, wherein the vibration plate has a thickness of 0.1 mm to 1.0 mm.

18. The display apparatus of claim 1, further comprising:
a twitter module comprising a plurality of twitters in the display module,
wherein the display module further comprises a printed circuit board connected to the display panel, and wherein each of the plurality of twitters comprises: a metal plate on the printed circuit board; and a piezoelectric element attached to the metal plate, the piezoelectric element comprising a piezoelectric material layer.

19. The display apparatus of claim 18, further comprising:
a system front cover covering a non-display area of the display panel and the printed circuit board,
wherein the system front cover comprises a plurality of sound output holes overlapping each of the plurality of twitters.

20. The display apparatus of claim 1, wherein the display module comprises:
a printed circuit board connected to the display panel; a user connector on the printed circuit board; a sound output connector connected to the vibration module; and an audio amplifier on the printed circuit board, the audio amplifier being configured to: amplify a sound signal input through the user connector to generate a sound driving signal, and output the generated sound driving signal to the sound output connector.

21. A computing apparatus, comprising: a system body; and
the display apparatus of claim 1 connected to the system body.

22. The computing apparatus of claim 21, further comprising a hinge part between the system body and the display apparatus, the hinge part being rotatable and configured to support the display apparatus.

23. A display apparatus, comprising:
a display module comprising a display panel configured to display an image;
a vibration plate adjacent to a rear surface of the display module;
a vibration module configured to vibrate the vibration plate;
a cover plate between a system rear cover and the vibration plate, the cover plate having a concave portion recessed from a portion of the cover plate overlapping the vibration module attached to the vibration plate;
a sound absorbing member on the cover plate between the cover plate and a rear surface of the vibration plate, the concave portion being between the cover plate and a rear surface of the vibration module;
a buffer member spaced apart from the vibration module, the buffer member being configured to protect the vibration module and the buffer member being on the vibration plate adjacent to the vibration module,
wherein a height of the buffer member with respect to the rear surface of the vibration plate is greater than a height of the vibration module with respect to the rear surface of the vibration plate, and
wherein the display panel is further configured to vibrate based on a vibration of the vibration plate to output sound.

24. The display apparatus of claim 23, further comprising:
the system rear cover covering the rear surface of the display module,
wherein the vibration plate is between the system rear cover and the display module, and
wherein the buffer member is between the vibration plate and the system rear cover.

25. The display apparatus of claim 23, wherein the vibration plate comprises one or more of: a magnesium (Mg) alloy material, a Mg-lithium (Li) alloy material, and an aluminum (Al) alloy material.

26. The display apparatus of claim 23, wherein the vibration plate has a thickness of 0.1 mm to 1.0 mm.

27. The display apparatus of claim 23, wherein the buffer member surrounds the vibration module.

28. The display apparatus of claim 23, wherein an air gap is provided between the cover plate and the system rear cover.

29. The display apparatus of claim 23, wherein an air gap is provided between the vibration plate and the cover plate.

* * * * *